United States Patent
Katsumata

(10) Patent No.: US 10,440,258 B2
(45) Date of Patent: Oct. 8, 2019

(54) ELECTRONIC EQUIPMENT, CONTROLLING METHOD OF ELECTRONIC EQUIPMENT, AND STORAGE MEDIUM

(71) Applicant: CANON KABUSHIKI KAISHA, Tokyo (JP)

(72) Inventor: Momoe Katsumata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 15/805,445

(22) Filed: Nov. 7, 2017

(65) Prior Publication Data
US 2018/0131866 A1 May 10, 2018

(30) Foreign Application Priority Data
Nov. 10, 2016 (JP) .................. 2016-219588

(51) Int. Cl.
H04N 5/232 (2006.01)
H04N 1/21 (2006.01)

(52) U.S. Cl.
CPC ....... *H04N 5/23216* (2013.01); *H04N 1/2112* (2013.01); *H04N 5/23293* (2013.01)

(58) Field of Classification Search
CPC ............. H04N 5/23216; H04N 1/2112; H04N 5/23293
See application file for complete search history.

(56) References Cited

U.S. PATENT DOCUMENTS

| 9,781,293 B2 * | 10/2017 | Jeong | G06F 16/00 |
| 2003/0174219 A1 * | 9/2003 | Iijima | H04N 1/2112 |
| | | | 348/231.99 |
| 2005/0007466 A1 * | 1/2005 | Tsukui | H04N 1/0044 |
| | | | 348/231.7 |
| 2005/0110878 A1 * | 5/2005 | Dalton | H04N 5/772 |
| | | | 348/231.2 |
| 2008/0052945 A1 * | 3/2008 | Matas | G06F 3/0485 |
| | | | 34/173 |

(Continued)

FOREIGN PATENT DOCUMENTS

| JP | 2003-196006 A | 7/2003 |
| JP | 2004-274457 A | 9/2004 |

(Continued)

*Primary Examiner* — Timothy J Henn
(74) *Attorney, Agent, or Firm* — Cowan, Liebowitz & Latman, P.C.

(57) ABSTRACT

To prevent a user's erroneous operation while avoiding complexity of operations, the present invention provides an electronic equipment comprising: a display controlling unit to execute control to display, in a case where an operation for executing a predetermined process to an image selected by a selecting operation is executed, a confirmation screen for confirming whether or not the process to the image is executable; a processing unit to execute the predetermined process to the image selected by the selecting operation, in accordance with acceptance of an execution instruction operation of the predetermined process in a state that the confirmation screen is displayed; and a controlling unit to execute control so as to make an operating method of the execution instruction operation different on the confirmation screen, in accordance with whether or not the image selected by the selecting operation is an image with which specific information is associated.

19 Claims, 16 Drawing Sheets

(56) References Cited

U.S. PATENT DOCUMENTS

| | | | | |
|---|---|---|---|---|
| 2008/0316300 A1* | 12/2008 | Okamoto | ............ | H04N 5/2258 348/47 |
| 2012/0300259 A1* | 11/2012 | Hosaka | ............... | G11B 27/034 358/1.15 |
| 2015/0022689 A1* | 1/2015 | Nakase | ............. | H04N 5/23293 348/231.2 |
| 2016/0224179 A1* | 8/2016 | Ichihara | ............... | G06F 3/0416 |
| 2017/0255841 A1* | 9/2017 | Yoo | ...................... | G06F 3/0488 |

FOREIGN PATENT DOCUMENTS

| | | |
|---|---|---|
| JP | 2011-107803 A | 6/2011 |
| JP | 2011-205257 A | 10/2011 |

\* cited by examiner

400a(400)

400b(400)

400c(400)

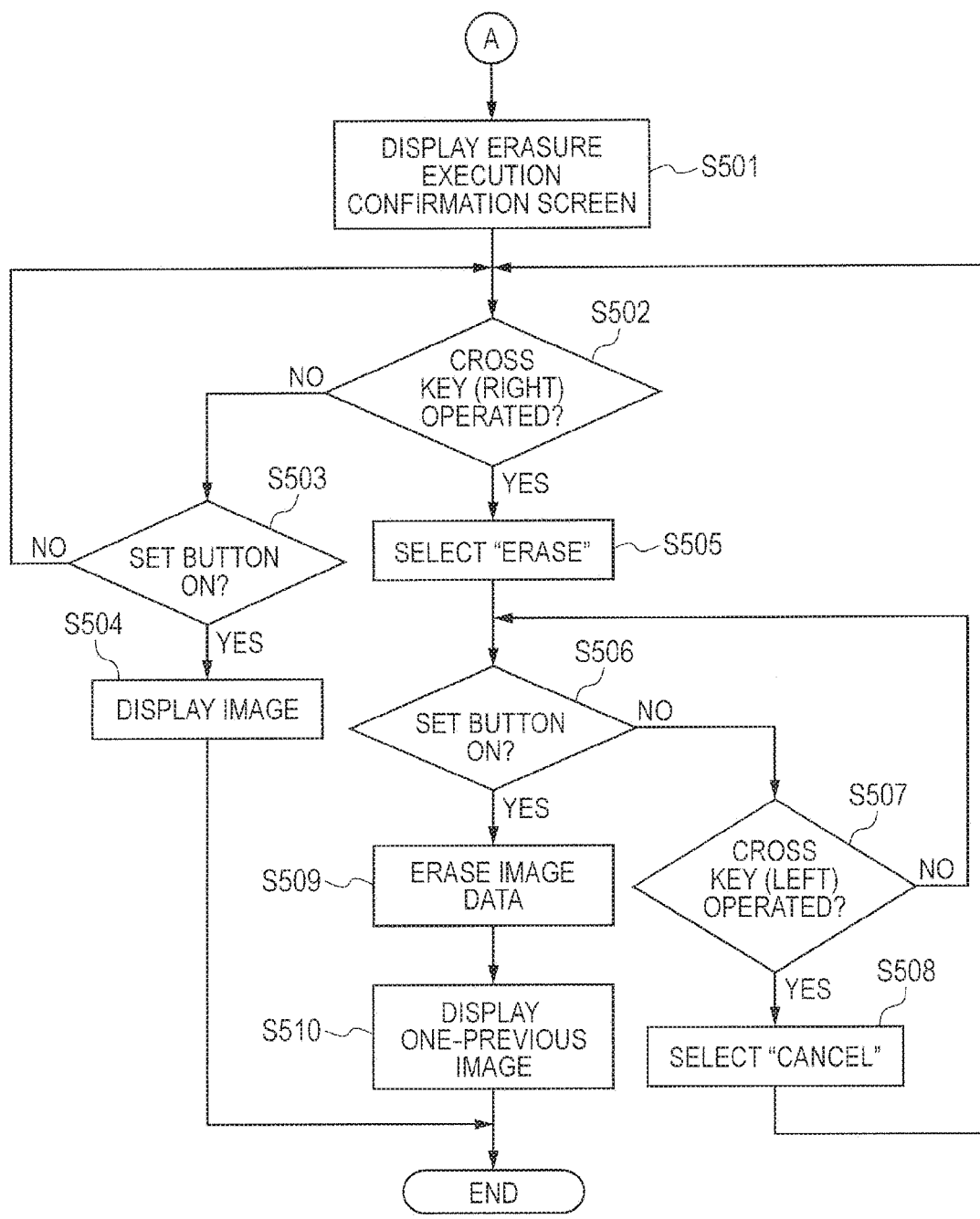

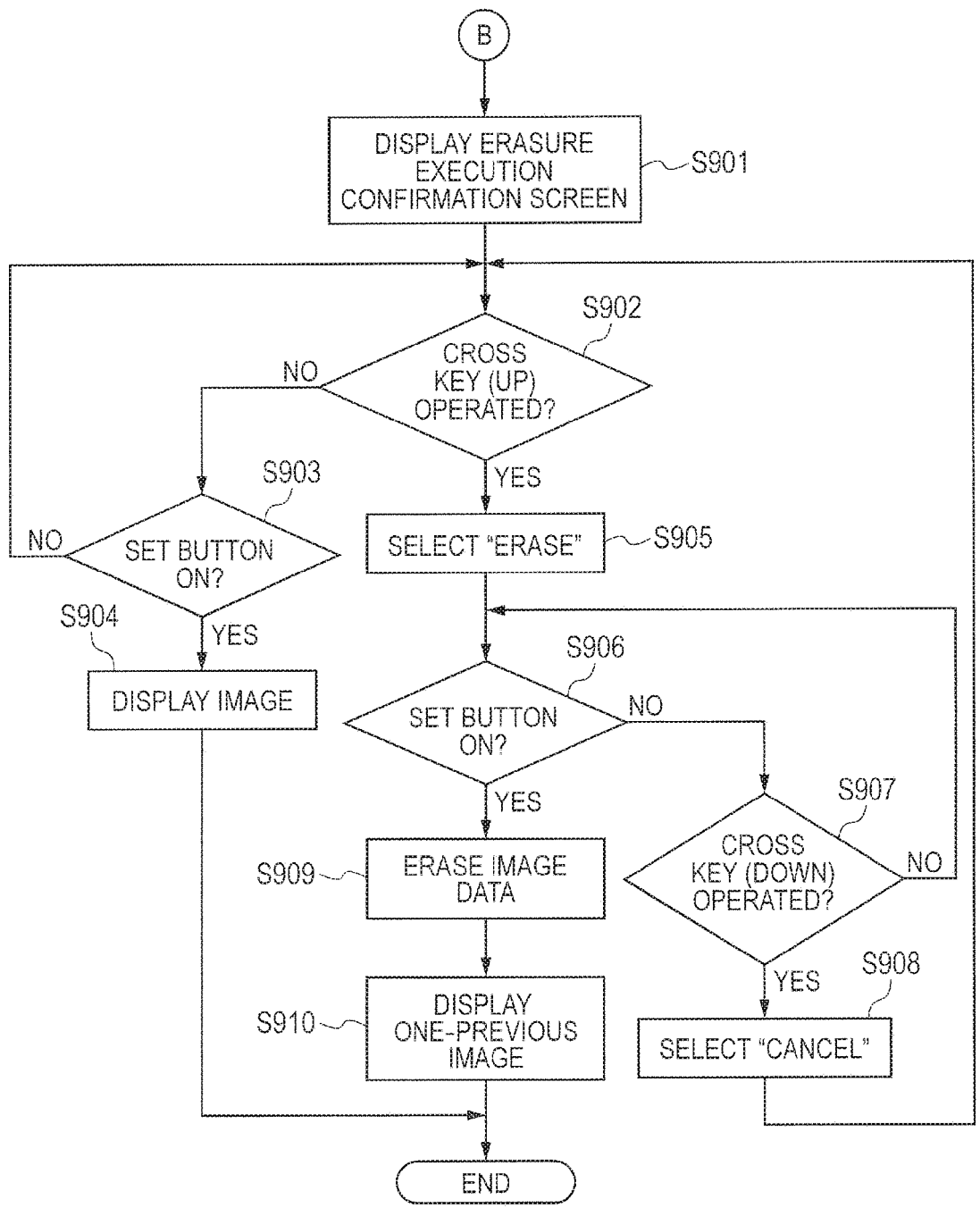

ELECTRONIC EQUIPMENT, CONTROLLING METHOD OF ELECTRONIC EQUIPMENT, AND STORAGE MEDIUM

BACKGROUND OF THE INVENTION

Field of the Invention

The present invention relates to an electronic equipment, a controlling method of an electronic equipment, and a storage medium storing a program to execute the controlling method.

Description of the Related Art

In recent years, there are various kinds of electronic equipment capable of reproducing and displaying images photographed by a digital camera and the like. In general, a user can instruct execution of various processes such as an erasing process, a transferring process, a printing process and the like in regard to a reproduced image. In this occasion, there is a case where the above process is erroneously executed due to an operation mistake or the like by the user. In order to prevent the erroneous process like this, the following techniques have been proposed.

In the technique disclosed in Japanese Patent Application Laid-Open No. 2004-274457, in a case where an album file stored in an album folder is deleted, a warning screen not displayed when a data file is deleted is displayed.

In the technique disclosed in Japanese Patent Application Laid-Open No. 2011-205257, in a case where it is instructed to execute deletion to data, an attention calling message is displayed if the relevant data has been used within a predetermined period of time. In the techniques disclosed in Japanese Patent Application Laid-Open No. 2004-274457 and Japanese Patent Application Laid-Open No. 2011-205257, when the warning display and the attention calling message are displayed, operations for further executing processes are executed, so that the processes are executed actually.

Besides, each of Japanese Patent Application Laid-Open No. 2003-196006 and Japanese Patent Application Laid-Open No. 2011-107803 discloses the technique of changing arrangement of icons on an operation screen each time an operation is executed.

However, in the technique disclosed in Japanese Patent Application Laid-Open No. 2004-274457, in the case where the album file is deleted, the number of operations required until such a deleting process is executed increases as compared with a case where the data file is deleted, so that the operation becomes complicated. Also, in the technique disclosed in Japanese Patent Application Laid-Open No. 2011-205257, in a case where a file used within the predetermined period of time is deleted, the number of operations required until the deleting process is executed increases as compared with a case where a file not used within the predetermined period of time is deleted, so that the operation becomes complicated.

Besides, in each of the techniques disclosed in Japanese Patent Application Laid-Open No. 2003-196006 and Japanese Patent Application Laid-Open No. 2011-107803, the arrangement of the icons is changed each time the operation is executed as described above. Therefore, for example, in a case where images to which specific information such as rating information or the like is not attached are continuously processed, the operation becomes complicated.

It is an object of the present invention to prevent a user's erroneous operation while avoiding complexity of operations.

SUMMARY OF THE INVENTION

An electronic equipment according to the present invention is characterized by comprising: a display controlling unit configured to execute control to display, in a case where an operation for executing a predetermined process to an image selected by a selecting operation is executed, a confirmation screen for confirming whether or not the process to the image is executable; a processing unit configured to execute the predetermined process to the image selected by the selecting operation, in accordance with acceptance of an execution instruction operation of the predetermined process in a state that the confirmation screen is displayed; and a controlling unit configured to execute control so as to make an operating method of the execution instruction operation different on the confirmation screen, in accordance with whether or not the image selected by the selecting operation is an image with which specific information is associated.

According to the present invention, it is possible to prevent a user's erroneous operation while avoiding complexity of operations.

Further features of the present invention will become apparent from the following description of exemplary embodiments with reference to the attached drawings.

BRIEF DESCRIPTION OF THE DRAWINGS

FIG. 5 is a flow chart for describing the image reproducing/erasing process in the first embodiment.

FIG. 9 is a flow chart for describing the image reproducing/erasing process in the first embodiment.

DESCRIPTION OF THE EMBODIMENTS

Hereinafter, preferred embodiments of the present invention will be described below with reference to the attached drawings.

First Embodiment

Initially, an operation of a digital camera as a comparative example of a digital camera 100 according to the present embodiment will be described with reference to FIGS. 17A to 17C.

Figure 17A:
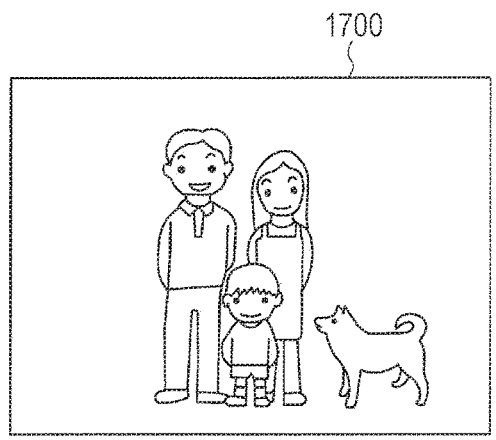
FIGS. 17A, 17B and 17C are diagrams for describing transition of erasure execution confirmation screens and the like in a comparative example.

FIG. 17A is a diagram for describing an image reproduction screen 1700 of a digital camera used as a comparative example. The image reproduction screen 1700 is a screen to be displayed on an image displaying unit of the digital camera used as the comparative example, and is a screen on which an image recorded or stored on a recording medium or the like of the digital camera used as the comparative example is reproduced.

Figure 17B:
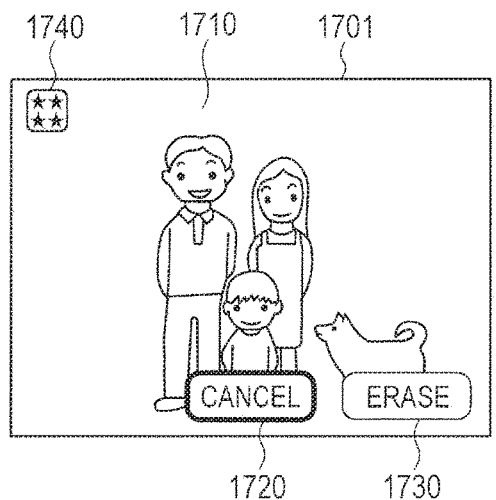
Figure 17C:
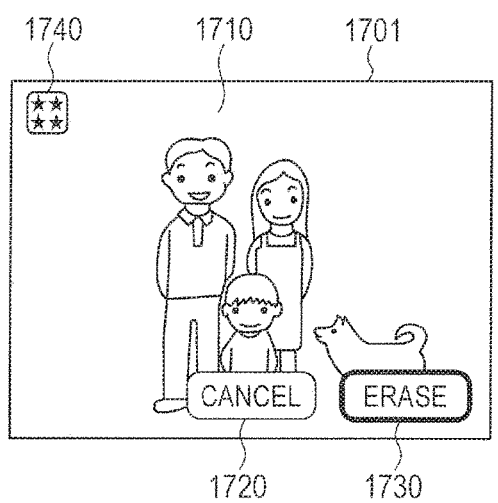

Each of FIGS. 17B and 17C is a diagram for describing an erasure execution confirmation screen 1701 of the digital camera used as the comparative example. For example, the erasure execution confirmation screen 1701 is displayed on the image displaying unit when an erasure button of the digital camera is depressed in a state that the image reproduction screen 1700 is displayed. On the erasure execution confirmation screen 1701, an image (process-target image) 1710 to be deleted (or erased), a "cancel (CANCEL)" icon 1720 for canceling deletion (or erasure), and an "erase (ERASE)" icon 1730 for executing the process are displayed. Here, the process-target image 1710 is an image which is reproduced on the image reproduction screen 1700. The "cancel" icon 1720 and the "erase" icon 1730 are superimposed (or superposed) on the process-target image 1710 and displayed.

Further, in a case where specific information has been attached to the process-target image 1710, a "specific information" icon 1740 may be displayed on the erasure execution confirmation screen 1701. Here, the specific information is information which is included in the attribute information of the process-target image 1710. In the digital camera used as the comparative example, it is assumed that the specific information is rating information.

The erasure execution confirmation screen 1701 illustrated in FIG. 17B is in a state that the "cancel" icon 1720 has been selected, and the erasure execution confirmation screen 1701 illustrated in FIG. 17C is in a state that the "erase" icon 1730 has been selected.

The initial state of the erasure execution confirmation screen 1701 is the state illustrated in FIG. 17B, and the "cancel" icon 1720 has been selected in this state. A user changes the selection of the icon by using an operation member of the digital camera to set the state that the "erase" icon 1730 is selected as illustrated in FIG. 17C. Then, when the user executes a deciding operation in the digital camera, the deletion of the process-target image 1710 is executed.

Here, the operation concerning the deletion of the image has been described, but the same applies to processes other than the deletion.

In the digital camera like this to be used as the comparative example, the operation for the image process (that is, the image deletion in the example of FIGS. 17A to 17C) is the same regardless of whether or not the specific information has been attached to the image to be processed. Therefore, when the same process is continuously executed for a plurality of images, there is a case where an operation for erroneously executing the process is executed even for an image which should not be processed originally due to habituation (familiarity) by repetitive operations.

In this context, by using the digital camera 100 according to the present embodiment to be described next, it is possible to avoid the erroneous operation like this.

Figure 1:
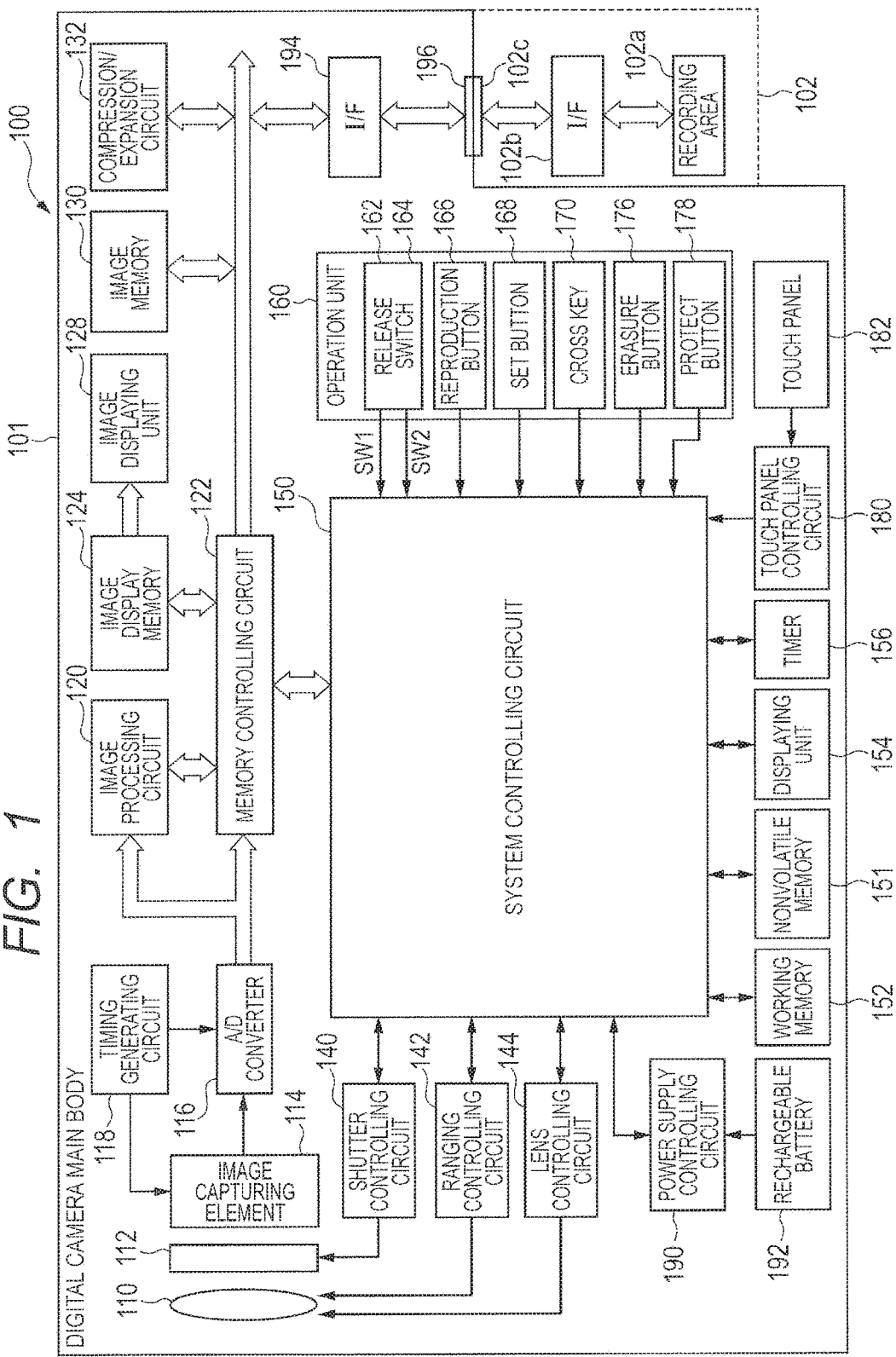
FIG. 1 is a block diagram of a digital camera.
Figure 2:
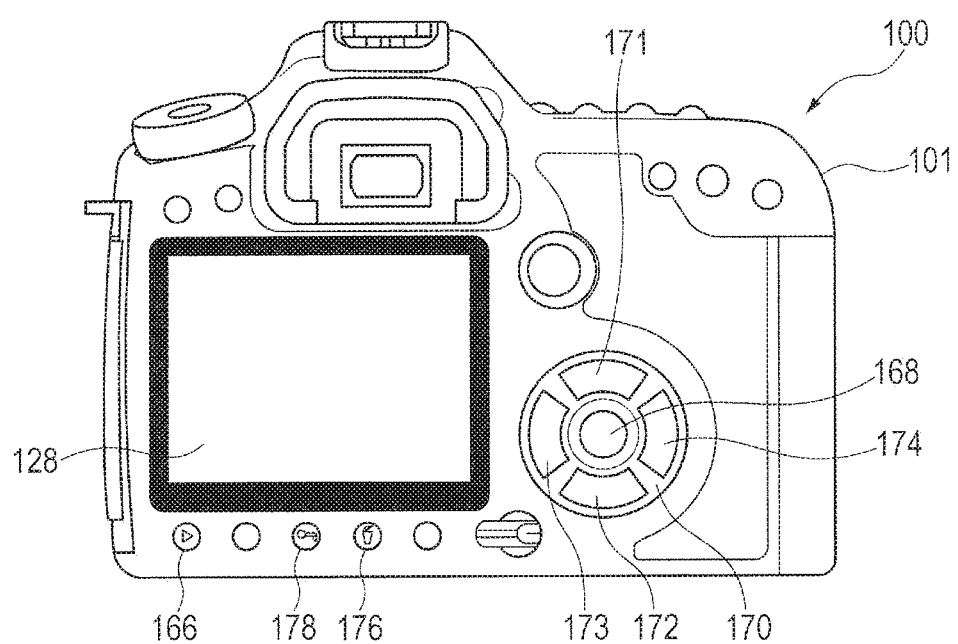
FIG. 2 is a back view of the digital camera.

First, a constitution of the digital camera 100 which is an example of an electronic equipment will be described with reference to FIGS. 1 and 2. That is, FIG. 1 is the block diagram for describing an internal constitution of the digital camera 100, and FIG. 2 is the back view of the digital camera 100.

Next, the constitution of a digital camera main body 101, which is the main body of the digital camera 100, will be described.

A photographing lens 110 guides transmitted light flux to an image capturing element 114.

A shutter 112 is used to control an exposure amount to the image capturing element 114.

There is the image capturing element 114 which is an image capturing element for converting an optical image into an electric signal. For example, a CCD (charge-coupled device) sensor, a CMOS (complementary metal-oxide semiconductor) sensor or the like is used as the image capturing element. The light flux incident on the photographing lens 110 is guided via the shutter 112, and an image based on the incident light flux is formed on the image capturing surface of the image capturing element 114 as an optical image.

An A/D (analog-to-digital) converter 116 converts an analog signal output from the image capturing element 114 into a digital signal (hereinafter referred to as an image).

A timing generating circuit 118 supplies a clock signal and a control signal to the image capturing element 114 and the A/D converter 116 respectively. The timing generating circuit 118 is controlled by a memory controlling circuit 122 and a system controlling circuit 150.

An image processing circuit 120 executes a predetermined pixel interpolating process and a color converting process, to an image from the A/D converter 116 or an image from the memory controlling circuit 122.

A memory control circuit 122 controls the A/D converter 116, the timing generating circuit 118, the image processing circuit 120, an image display memory 124, an image memory 130 and a compression/expansion circuit 132. The image which is output from the A/D converter 116 is written into the image display memory 124 or the image memory 130 via the image processing circuit 120 and the memory controlling circuit 122, or via only the memory controlling circuit 122.

There is an image display memory 124 in which an image to be displayed is written.

There is an image displaying unit 128. For example, the image displaying unit is a TFT (thin-film transistor) or the like.

The image display memory 124 and the image displaying unit 128 execute a process for image display. More specifically, the image which is used for display and has been written in the image display memory 124 is output to the image displaying unit 128 and thus displayed. Besides, it is also possible to read the image recorded in a recording area 102a of a recording medium 102, execute a predetermined process by the compression/expansion circuit 132, and then display the processed image on the image displaying unit 128 via the image display memory 124. Besides, it is also possible to superimpose a display related to specific information recorded in association with the image and/or a display related to the operation of the digital camera on the image, and display the acquired image on the image displaying unit 128.

There is an image memory 130. The image memory 130 is a storage medium for storing photographed and captured still images and moving images, and has a sufficient storage capacity for storing a predetermined number of still images and moving images for a predetermined time. Thus, even in a case where continuous photographing of continuously photographing a plurality of still images, it is possible to execute high-speed and large-capacity image writing to the image memory 130. Besides, the image memory 130 can be used also as a working area of the system controlling circuit 150.

The compression/expansion circuit 132 compresses and expands (decompresses) an image by adaptive discrete cosine transformation (ADCT) or the like. The compression/expansion circuit 132 reads the image stored in the image memory 130, executes a compressing process or an expanding (decompressing) process, and writes the processed image into the image memory 130.

A shutter controlling circuit 140 controls the shutter 112 under the control of the system controlling circuit 150.

A ranging (distance measurement) controlling circuit 142 controls focusing of the photographing lens 110 under the control of the system controlling circuit 150.

A lens controlling circuit 144 executes various kinds of control on the photographing lens 110 under the control of the system controlling circuit 150.

The system controlling circuit 150 controls the digital camera main body 101 as a whole.

A nonvolatile memory 151 stores therein programs to be executed by the system controlling circuit, constants for operation of the system controlling circuit 150, and the like.

A working memory 152 stores therein variables and the like to be used by the system controlling circuit, and is used as the working area of the system controlling circuit.

Figure 3:
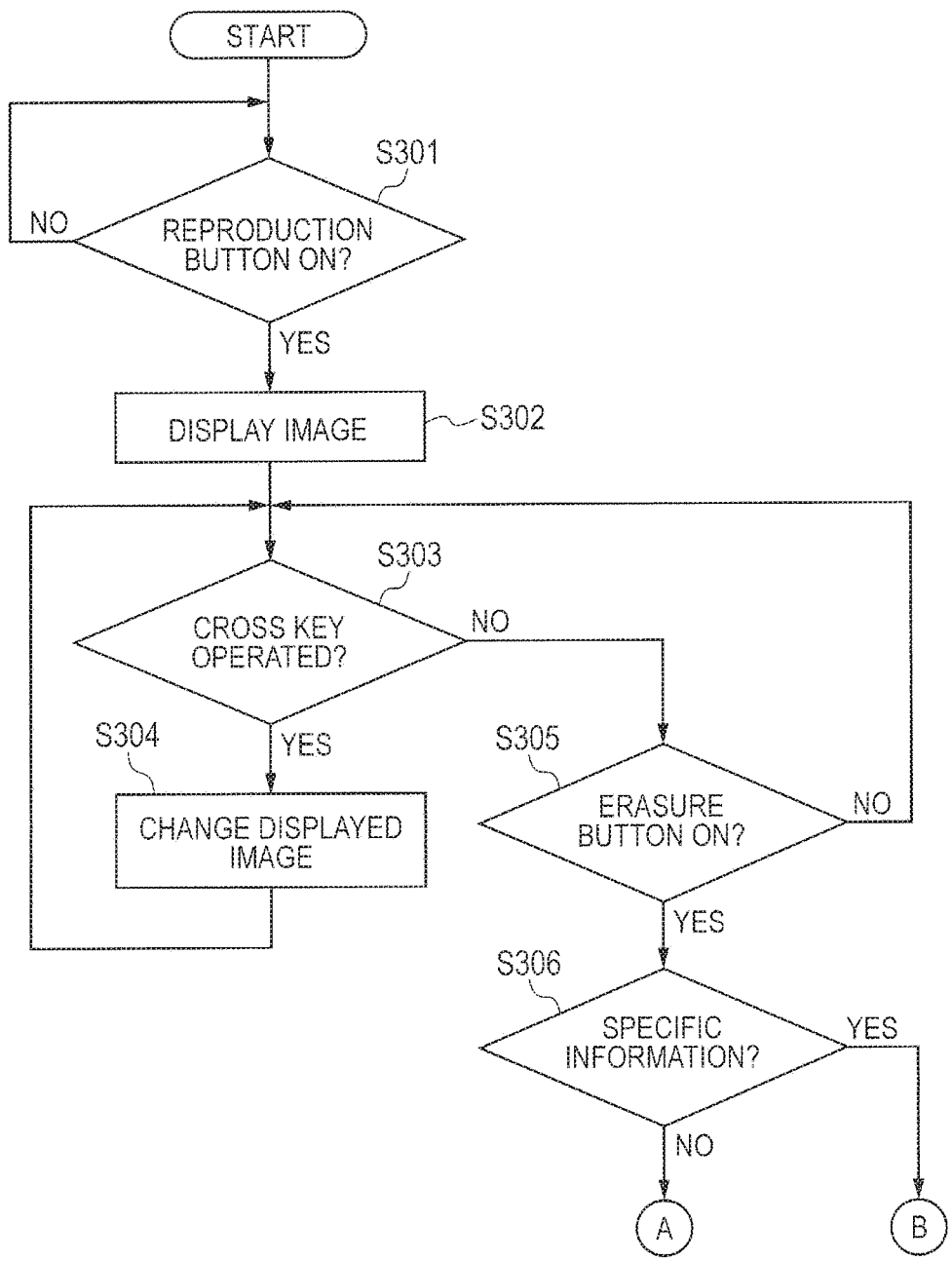
FIG. 3 is a flow chart for describing an image reproducing/erasing process in a first embodiment.
Figure 7:
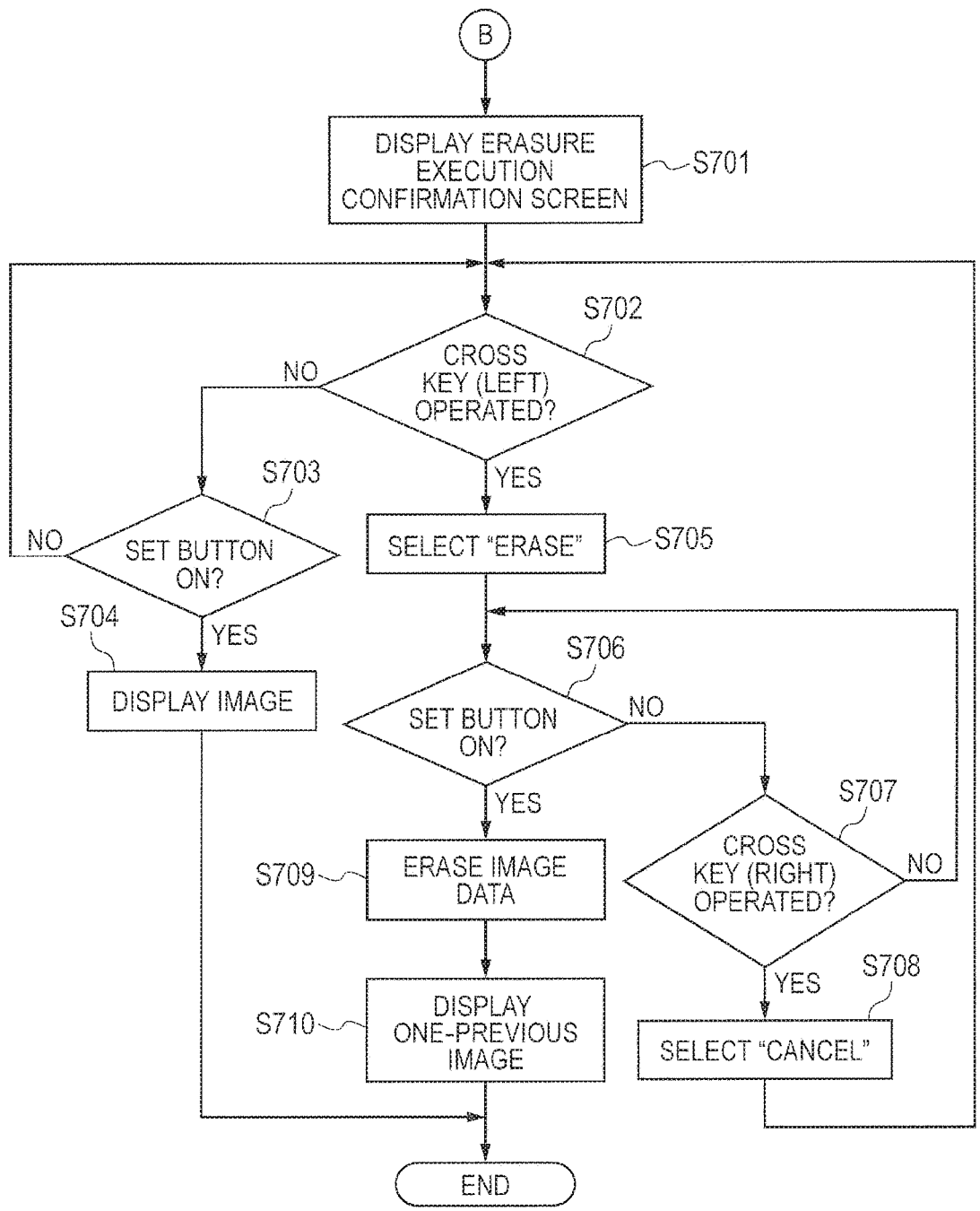
FIG. 7 is a flow chart for describing the image reproducing/erasing process in the first embodiment.

Here, it should be noted that processes indicated in respective flow charts of FIGS. 3, 5, 7 and the like are realized on the premise that the system controlling circuit 150 develops the programs stored in the nonvolatile memory 151 to the working memory 152 and executes the developed programs.

In accordance with execution of the programs in the system controlling circuit 150, a displaying unit 154 displays an operation state and a message by using characters, images, sounds and the like, activates a displaying function of a liquid crystal display or the like, and generates an operation sound, a warning sound and the like. In this context, the displaying unit 154 has a sound generating function device such as a speaker or the like.

A timer 156 is used to measure an elapsed time.

There is an operation unit 160 which comprises various buttons, switches, and the like. The operation unit is used to select various functions when executing photographing and reproduction, execute setting of switching, issue instructions related to the photographing and the reproduction.

A release switch SW1 (162) is turned ON in the middle of an operation of a release button (not illustrated), thereby instructing to start operations of an AF (autofocus) process, an AE (automatic exposure) process, a WB (white balance) process, an EF (strobe light controlling) process and the like. A release switch SW2 (164) is turned ON in response to completion of the operation of the release button (not illustrated), thereby instructing to start a series of processes of an exposing process, a developing process and a recording process. The exposing process is a process of writing an image based on a signal read out from the image capturing element 114 into the image memory 130 via the A/D converter 116 and the memory controlling circuit 122. The developing process is a process which is executed by using the calculations in the image processing circuit 120 and the memory controlling circuit 122. The recording process is a process of reading an image from the image memory 130, compressing the read image by the compression/expansion circuit 132, and writing the compressed image on the recording medium 102.

There is a reproduction button 166. When the reproduction button 166 is turned ON, reproduction of the image is executed as follows. That is, under the control of the system controlling circuit 150, the image recorded in the recording area 102a of the recording medium 102 is read via interfaces (I/Fs) (194, 102b) and connectors (196, 102c). Next, the memory controlling circuit 122 executes a predetermined process by controlling the compression/expansion circuit 132, and then processed image is displayed on the image displaying unit 128 via the image display memory 124.

There is a set button 168. With respect to a condition selected by a cross key 170 or the like, the user instructs decision of the selected condition to the digital camera 100 by turning ON the set button 168. The set button 168 is an example of a deciding operation member.

The cross key 170 comprises an up button 171, a down button 172, a left button 173 and a right button 174. The user can select various settings by operating the cross key 170. That is, it is possible to execute the various settings by turning ON the set button 168 after selecting the settings by the cross key 170. The cross key 170 is an example of a selecting operation member.

An erasure button 176 is one of image processing operation units. When the erasure button is turned ON in a state that an image is displayed on the image displaying unit 128, an image erasure confirmation screen is displayed on the image displaying unit 128. Thus, it is confirmed for the user whether or not an image erasing process is executable.

A protect button 178 is one of the image processing operation units. When the protect button is turned ON in the state that an image is displayed on the image displaying unit 128, the displayed image is protected so as not to be erasable.

There are a touch panel controlling circuit 180 and a touch panel 182. The touch panel 182 is used to detect a touch operation (contact operation) and a touch position (contact position) on the image displaying unit 128.

A power supply controlling circuit 190 is constituted by a battery detecting circuit, a DC/DC (direct current/direct current) converter, a switch circuit for switching a block to be energized, and the like, and detects a battery remaining amount of a rechargeable battery 192. Then, the power supply controlling circuit 190 controls the DC/DC converter based on a result of battery remaining amount detection and an instruction by the system controlling circuit 150, thereby supplying a necessary voltage to each unit including the recording medium 102 for a necessary period of time.

The rechargeable battery 192, which is constituted by a secondary battery such as a NiCd battery, a NiMH battery, a Li battery or the like, is a battery serving as a power supply of the digital camera main body 101.

There is the I/F 194 which is used to interface with the recording medium 102.

The connector 196 is used to connect to the recording medium 102.

There is the recording medium 102 such as a memory card, a hard disk or the like. The recording medium 102 comprises the recording area 102a constituted by a semiconductor memory, a magnetic disk or the like, the I/F 102b used to interface with the digital camera main body 101, and the connector 102c to be used for connecting to the digital camera main body 101. An image is recorded in the recording area 102a. Besides, in the recording area 102a, image capturing information is recorded as image capturing information data in association with the image. The recording medium 102 is detachably mounted and installed to the digital camera main body 101.

Next, the specific information will be described. There are various kinds of attribute information for the image. The attribute information of the image is recorded in association with the image on the recording medium 102 or the like as necessary. The specific information is information which is included in the attribute information. In the present embodiment, the specific information is the rating information which represents a rating level of the image. The image to which the specific information is recorded in association with the relevant image is referred to as the image to which the specific information has been attached, and the image to which the specific information is not recorded in association with the relevant image is referred to as the image to which the specific information is not attached.

Next, an image reproducing/erasing process will be described. It should be noted that the image reproducing/erasing process is a process of reproducing and/or erasing an image.

Figure 4A:
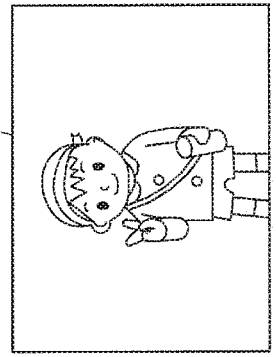
FIGS. 4A, 4B and 4C are diagrams for describing transition of an image reproduction screen in the first embodiment.
Figure 4B:
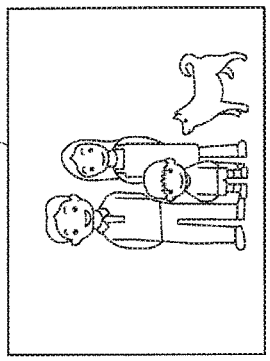
Figure 4C:
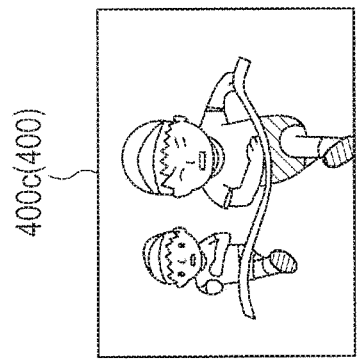

First, with reference to FIG. 3 and FIGS. 4A to 4C, a process of reproducing an image in the image reproducing/erasing process will be described. FIG. 3 is the flow chart for describing the process of reproducing an image in the image reproducing/erasing process, and FIGS. 4A to 4C are the diagrams for describing transition of an image reproduction screen 400.

In S301, the system controlling circuit 150 determines whether or not the reproduction button 166 is ON. When it is determined that the reproduction button 166 is ON, the system controlling circuit 150 advances the process to S302. On the other hand, when it is determined that the reproduction button 166 is not ON, the system controlling circuit again executes the process in S301.

In S302, the system controlling circuit 150 executes display control to display the image reproduction screen 400 on the image displaying unit 128. As illustrated in FIGS. 4A to 4C, the image reproduction screen 400 is a screen on which the images recorded on the recording medium 102 are reproduced. The system controlling circuit 150 controls the memory controlling circuit 122 to read the image recorded in the recording area 102a of the recording medium 102 via the I/F 194 and the I/F 102b and the connectors 196 and 102c. Under the control of the system controlling circuit 150, the read-out image is subjected to a predetermined image process by the compression/expansion circuit 132 and the image processing circuit 120. Under the control of the system controlling circuit 150, the image which has been subjected to the predetermined image processes is recorded in the image display memory 124, and then displayed on the image displaying unit 128. In this way, the image reproduction screen 400 is displayed.

In S303, the system controlling circuit 150 determines whether or not the cross key 170 is operated. When it is determined that the cross key 170 is operated, the system controlling circuit 150 advances the process to S304. On the other hand, when it is determined that the cross key 170 is not operated, the system controlling circuit advances the process to S305. When the cross key 170 is operated in the state that the image reproduction screen 400 is displayed, such an operation means that the user operates to change the image to be reproduced.

In S304, the system controlling circuit 150 controls the memory controlling circuit 122 to read the image recorded in the recording area 102a of the recording medium 102 and display the read-out image on the image displaying unit 128.

For example, it is assumed that the left button 173 of the cross key 170 is operated in a state that an image reproduction screen 400b of FIG. 4B is displayed on the image displaying unit 128. In this case, an image which has been recorded in the recording area 102a of the recording medium 102 and is a one-previous image of the image being reproduced on the image reproduction screen 400b is reproduced on the image displaying unit 128. Then, the image reproduction screen 400 displayed on the image displaying unit 128 becomes an image reproduction screen 400a illustrated in FIG. 4A.

Besides, it is assumed that the right button 174 of the cross key 170 is operated in the state that the image reproduction screen 400b of FIG. 4B is displayed on the image displaying unit 128. In this case, an image which has been recorded in the recording area 102a of the recording medium 102 and is a one-posterior image of the image being reproduced on the image reproduction screen 400b is reproduced on the image displaying unit 128. Then, the image reproduction screen 400 displayed on the image displaying unit 128 becomes an image reproduction screen 400c illustrated in FIG. 4C.

In S305, the system controlling circuit 150 determines whether or not the erasure button 176 is ON. When it is determined that the erasure button 176 is ON, the system controlling circuit 150 advances the process to S306. On the other hand, when it is determined that the erasure button 176 is not ON, the system controlling circuit returns the process to S303.

In S306, the system controlling circuit 150 determines whether or not the specific information has been attached to the image currently reproduced and displayed on the image displaying unit 128. When it is determined that the specific information has been attached to the image reproduced and displayed on the image displaying unit 128, the system controlling circuit 150 advances the process to S701 illustrated in FIG. 7. On the other than, when it is determined that the specific information is not attached to the image currently reproduced and displayed on the image displaying unit 128, the system controlling circuit 150 advances the process to S501 illustrated in FIG. 5.

Figure 6A:
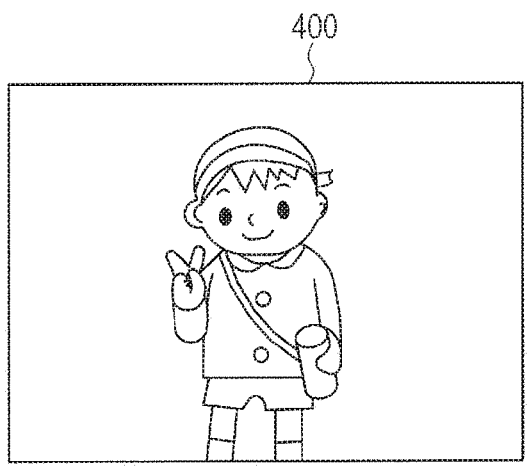
FIGS. 6A, 6B and 6C are diagrams for describing transition of an erasure execution confirmation screen and the like in the first embodiment.
Figure 6B:
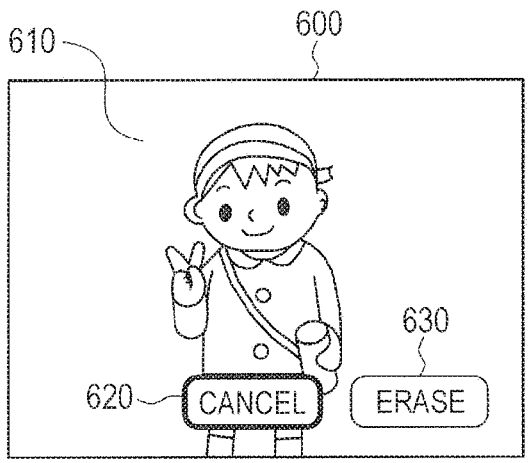
Figure 6C:
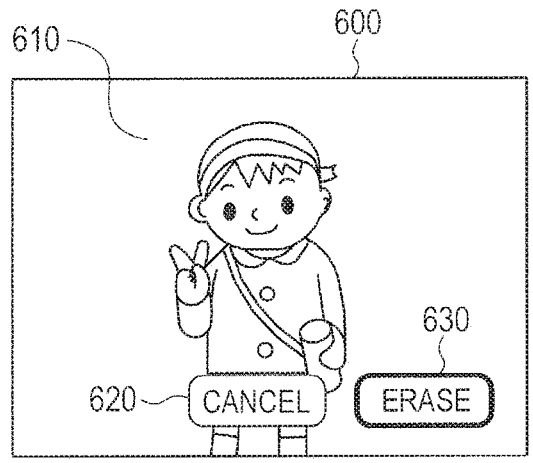

Next, with reference to FIG. 5 and FIGS. 6A to 6C, a process of erasing, in the image reproducing/erasing process, the image to which the specific information is not attached will be described. FIG. 5 is the flow chart for describing the process of erasing, in the image reproducing/erasing process, the image to which the specific information is not attached. Besides, FIG. 6A is the diagram for describing the image reproduction screen 400 immediately before the erasure button 176 is ON. Each of FIGS. 68B and 6C is the diagram for describing a process execution confirmation screen of the image to which the specific information is not attached. Since the process to be described here is deletion of image, the process execution confirmation screen in each of FIGS. 6B and 6C is referred to as an erasure execution confirmation screen 600.

In S501, the system controlling circuit 150 executes display control to display the erasure execution confirmation screen 600 on the image displaying unit 128.

Here, the erasure execution confirmation screen 600 will be described with reference to FIGS. 6B and 6C. The erasure execution confirmation screen 600 is a confirmation screen for confirming whether or not the process of erasing the image is executable. On the erasure execution confirmation screen 600, a process-target image 610, a "cancel (CANCEL)" icon 620 and an "erase (ERASE)" icon 630 are displayed.

The process-target image 610 is an image which is to be subjected to the erasing process, and is, for example, an image displayed on the immediately preceding image reproduction screen 400 illustrated in FIG. 6A.

The "cancel" icon 620 is an icon for the user to execute an instruction operation for canceling the process of erasing the image, and is superimposed and displayed on the process-target image 610. The "cancel" icon 620 is arranged at the lower center of the erasure execution confirmation screen 600.

The "erase" icon 630 is an icon for the user to execute an instruction operation for erasing the image, and is superimposed and displayed on the process-target image 610. The "erase" icon 630 is arranged on the lower right side of the erasure execution confirmation screen 600.

The "cancel" icon 620 and the "erase" icon 630 are displayed in a selectable way on the erasure execution confirmation screen 600. As illustrated in FIG. 6B, the initial state of the erasure execution confirmation screen 600 is a state that the "cancel" icon 620 has been initially selected. In the erasure execution confirmation screen 600 displayed in S501, the "cancel" icon 620 has been initially selected.

The system controlling circuit 150 controls the memory controlling circuit 122 to execute display control for creating an image of the erasure execution confirmation screen 600, storing the created image in the image display memory 124, and then displaying the relevant image on the image displaying unit 128.

In S502, the system controlling circuit 150 determines whether or not the cross key 170 is operated and thus the right button 174 of the cross key 170 is ON. When it is determined that the right button 174 of the cross key 170 is ON, the system controlling circuit 150 advances the process to S505. On the other hand, when it is determined that the right button 174 of the cross key 170 is not ON, the system controlling circuit advances the process to S503.

In S503, the system controlling circuit 150 determines whether or not the set button 168 is ON. When it is determined that the set button 168 is ON, the system controlling circuit 150 advances the process to S504. On the other hand, when it is determined that the set button 168 is not ON, the system controlling circuit returns the process to S502.

In S504, the system controlling circuit 150 terminates the display of the erasure execution confirmation screen 600, and executes display control to display the most recently displayed image reproduction screen 400 on the image displaying unit 128.

In S505, the system controlling circuit 150 executes control so as to be in the state that the "erase" icon 630 on the erasure execution confirmation screen 600 is selected as illustrated in FIG. 6C.

In S506, the system controlling circuit 150 determines whether or not the set button 168 is ON. When it is determined that the set button 168 is ON, the system controlling circuit 150 advances the process to S509. On the other hand, when it is determined that the set button 168 is not ON, the system controlling circuit advances the process to S507.

In S507, the system controlling circuit 150 determines whether or not the cross key 170 is operated and thus the left button 173 of the cross key 170 is ON. When it is determined that the left button 173 of the cross key 170 is ON, the system controlling circuit 150 advances the process to S508. On the other hand, when it is determined that the left button 173 of the cross key 170 is not ON, the system controlling circuit returns the process to S506.

In S508, the system controlling circuit 150 executes control so as to be in the state that the "cancel" icon 620 on the erasure execution confirmation screen 600 is selected as illustrated in FIG. 6B. Thereafter, the system controlling circuit 150 returns the process to S502.

In S509, the system controlling circuit 150 executes control to erase the process-target image 610 displayed on the erasure execution confirmation screen 600 from the recording area 102a of the recording medium 102.

In S510, the system controlling circuit 150 executes display control to display the image reproduction screen 400 on the image displaying unit 128. The image to be reproduced on the image reproduction screen 400 is an image which has been recorded in the recording area 102a of the recording medium 102 and is one-previous image of the image erased in S509.

As just described, in case of erasing the image to which the specific information is not attached, it is possible to erase the relevant image by executing, after the erase execution confirmation screen 600 is displayed, the two operations of operating the right button 174 of the cross key 170 and then operating the set button 168.

Figure 8A:
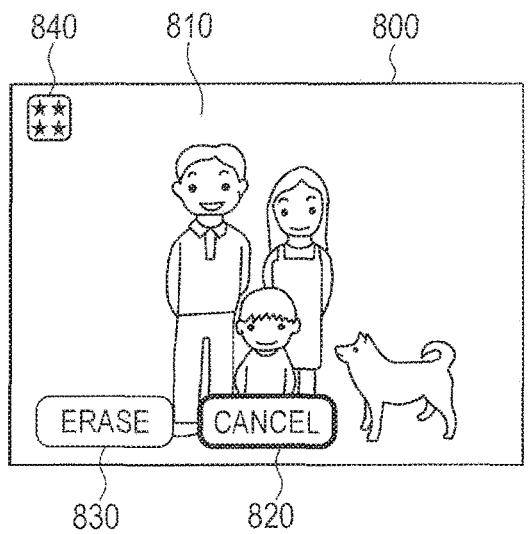
FIGS. 8A and 8B are diagrams for describing transition of an erasure execution confirmation screen in the first embodiment.
Figure 8B:
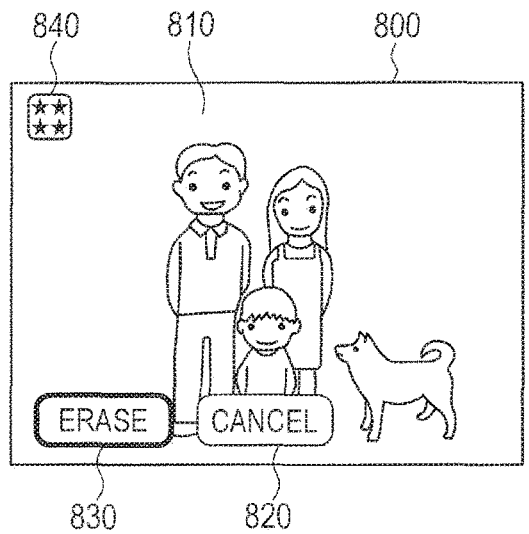

Next, with reference to FIG. 7 and FIGS. 8A and 8B, a process of erasing, in the image reproducing/erasing process, the image to which the specific information has been attached will be described. FIG. 7 is the flow chart for describing the process of erasing, in the image reproducing/erasing process, the image to which specific information has been attached. FIGS. 8A and 8B are the diagrams for describing transition of an erasure execution confirmation screen 800 for the image to which the specific information has been attached.

In S701, the system controlling circuit 150 executes display control to display the erasure execution confirmation screen 800 on the image displaying unit 128.

Here, the erasure execution confirmation screen 800 will be described with reference to FIGS. 8A and 8B. The erasure execution confirmation screen 800 is a confirmation screen for confirming whether or not the process of erasing the image is executable. On the erasure execution confirmation screen 800, a process-target image 810, a "cancel (CANCEL)" icon 820, an "erase (ERASE)" icon 830 and a "specific information" icon 840 are displayed.

The process-target image 810 is an image to be subjected to the erasing process, and is an image displayed on the immediately preceding image reproduction screen 400. The specific information has been attached to the process-target image 810 here.

The "cancel" icon 820 is an icon for the user to execute an instruction operation of canceling the process of erasing the image, and is superimposed and displayed on the process-target image 810. The "cancel" icon 820 is arranged at the lower center of the erasure execution confirmation screen 800. As well as the "cancel" icon 620 illustrated in FIGS. 6B and 6C, the "cancel" icon 820 is an example of a display item.

The "erase" icon 830 is an icon for the user to execute an instruction operation for erasing the image, and is superimposed and displayed on the process-target image 810. The "erase" icon 830 is arranged on the lower left side of the erasure execution confirmation screen 800. As well as the "erase" icon 630 illustrated in FIGS. 6B and 6C, the "erase" icon 830 is an example of a display item for accepting an execution instruction operation of image erasure.

The "cancel" icon 820 and the "erase" icon 830 are displayed in a selectable way on the erasure execution confirmation screen 800. As illustrated in FIG. 8A, the initial state of the erasure execution confirmation screen 800 is a state that the "cancel" icon 820 has been initially selected. In the erasure execution confirmation screen 800 displayed in S701, the "cancel" icon 620 has been initially selected.

The "specific information" icon 840 is an icon which indicates the specific information attached to the process-target image 810, and is superimposed and displayed on the process-target image 810. In the present embodiment, the specific information is the rating information. Here, it is assumed that a rating level "4" as the specific information has been attached to the process-target image 810 in FIGS. 8A and 8B.

The system controlling circuit 150 controls the memory controlling circuit 122 to execute display control for creating an image of the erasure execution confirmation screen 800, storing the created image in the image display memory 124, and then display the stored image on the image displaying unit 128.

In S702, the system controlling circuit 150 determines whether or not the cross key 170 is operated and thus the left button 173 of the cross key 170 is ON. When it is determined that the left button 173 of the cross key 170 is ON, the system controlling circuit 150 advances the process to S705. On the other hand, when it is determined that the left button 173 of the cross key 170 is not ON, the system controlling circuit advances the process to S703.

In S703, the system controlling circuit 150 determines whether or not the set button 168 is ON. When it is determined that the set button 168 is ON, the system controlling circuit 150 advances the process to S704. On the other hand, when it is determined that the set button 168 is not ON, the system controlling circuit returns the process to S702.

In S704, the system controlling circuit 150 terminates the display of the erasure execution confirmation screen 800, and executes display control to display the most recently displayed image reproduction screen 400 on the image displaying unit 128.

In S705, the system controlling circuit 150 executes control so as to be in the state that the "erase" icon 830 on the erasure execution confirmation screen 800 is selected as illustrated in FIG. 8B.

In S706, the system controlling circuit 150 determines whether or not the set button 168 is ON. When it is determined that the set button 168 is ON, the system controlling circuit 150 advances the process to S709. On the other hand, when it is determined that the set button 168 is not ON, the system controlling circuit advances the process to S707.

In S707, the system controlling circuit 150 determines whether or not the cross key 170 is operated and thus the right button 174 of the cross key 170 is ON. When it is determined that the right button 174 of the cross key 170 is ON, the system controlling circuit 150 advances the process to S708. On the other hand, when it is determined that the right button 174 of the cross key 170 is not ON, the system controlling circuit returns the process to S706.

In S708, the system controlling circuit 150 executes control so as to be in the state that the "cancel" icon 820 on the erasure execution confirmation screen 800 is selected as illustrated in FIG. 8A. After then, the system controlling circuit 150 returns the process to S702.

In S709, the system controlling circuit 150 executes control to erase the process-target image 810 displayed on the erasure execution confirmation screen 800 from the recording area 102a of the recording medium 102.

In S710, the system controlling circuit 150 executes display control to display the image reproduction screen 400 on the image displaying unit 128. The image to be reproduced on the image reproduction screen 400 is an image which has been recorded in the recording area 102a of the recording medium 102 and is one-previous image of the image erased in S709.

As just described, in case of erasing the image to which the specific information has been attached, it is possible to erase the relevant image by executing, after the erase execution confirmation screen 800 is displayed, the two operations of operating the left button 173 of the cross key 170 and then operating the set button 168.

Although the kinds of buttons to be operated from the display of the erasure execution confirmation screen to the erasure are different between when erasing the image to which the specific information is not attached and when erasing the image to which the specific information has been attached, the number of the operations is the same in two times therebetween. Namely, it is possible to prevent an erroneous operation by the user by changing the operating method until the erasure of the image without increasing the number of the operations.

Figure 10A:
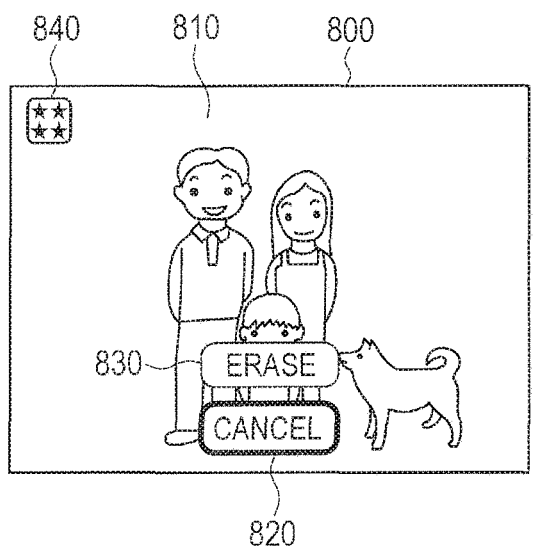
FIGS. 10A and 10B are diagrams for describing transition of the erasure execution confirmation screen in the first embodiment.
Figure 10B:
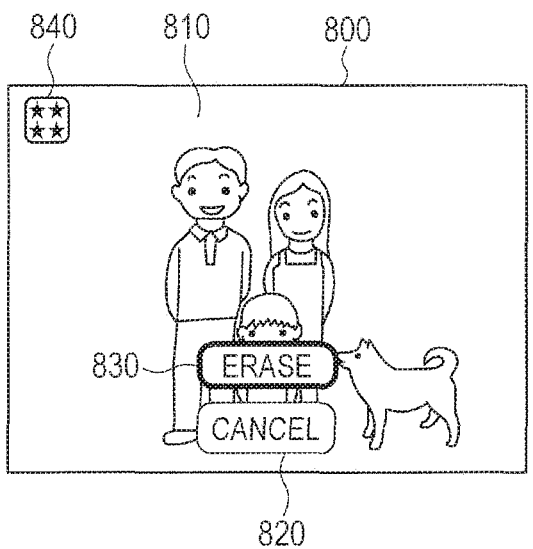

Next, a modified example of the process of erasing, in the image reproducing/erasing process, the image to which the specific information has been attached will be described with reference to FIG. 9 and FIGS. 10A and 10B. FIG. 9 is the flow chart for describing the process of erasing, in the image reproducing/erasing process, the image to which the specific information has been attached. FIGS. 10A and 10B are the diagrams for describing transition of the erasure execution confirmation screen 800 of the image to which specific information has been attached.

In S901, the system controlling circuit 150 executes display control to display the erasure execution confirmation screen 800 on the image displaying unit 128. The erasure execution confirmation screen 800 of the modified example illustrated in FIGS. 10A and 10B is different from the erasure execution confirmation screen 800 illustrated in FIGS. 8A and 8B in the arrangements of the "cancel" icon 820 and the "erase" icon 830. In the erasure execution confirmation screen 800 of the modified example illustrated in FIGS. 10A and 10B, the "cancel" icon 820 is arranged at the lower center of the erasure execution confirmation screen 800, and the "erase" icon 830 is arranged on the upper side of the "cancel" icon 820. As illustrated in FIG. 10A, the initial state of the erasure execution confirmation screen 800 of the modified example is a state that the "cancel" icon 820 has been initially selected. With respect to other points, the erasure execution confirmation screen 800 of the modified example is the same as the erasure execution confirmation screen 800 illustrated in FIGS. 8A and 8B.

Incidentally, in the modified example, the process in S901 is executed when the system controlling circuit 150 determines in S306 of FIG. 3 that the specific information has been attached to the image currently reproduced and displayed on the image displaying unit 128.

In S902, the system controlling circuit 150 determines whether or not the cross key 170 is operated and thus the up button 171 of the cross key 170 is ON. When it is determined that the up button 171 of the cross key 170 is ON, the system controlling circuit 150 advances the process to S905. On the other hand, when it is determined that the up button 171 of the cross key 170 is not ON, the system controlling circuit advances the process to S903.

Since the processes in S903 to S906 are the same as those in S703 to S706 of FIG. 7, detailed description thereof will be omitted.

In S907, the system controlling circuit 150 determines whether or not the cross key 170 is operated and thus the down button 172 of the cross key 170 is ON. When it is determined that the down button 172 of the cross key 170 is ON, the system controlling circuit 150 advances the process to S908. On the other hand, when it is determined that the down button 172 of the cross key 170 is not ON, the system controlling circuit returns the process to S906.

Since the processes in S908 to S910 are the same as those in S708 to S710 in FIG. 7, detailed description thereof will be omitted.

As described above, in accordance with whether or not the specific information has been attached to the image, the digital camera 100 executes the control to change the screen to the erasure execution confirmation screen 600 illustrated in FIGS. 6B and 6C or to the erasure execution confirmation screen 800 illustrated in FIGS. 8A, 8B, 10A and 10B. Here, how to execute the execution instruction operation for the image erasure is different between the erasure execution confirmation screen 600 and the erasure execution confirmation screen 800.

In the case where the user continuously erases the images to which the specific information is not attached and then erases the image to which the specific information has been attached, there is a fear that an erroneous operation resulting from habituation of handling caused by such repetitive operations may occur. This is because the method for the execution instruction operation of the image to which the specific information is not attached is different from the method for the execution instruction operation of the image to which the specific information has been attached. According to the present embodiment, it is possible to prevent the erroneous operation like this.

Besides, as well as the case of erasing the image to which the specific information is not attached, in the case of erasing the image to which the specific information has been attached, for example, a warning screen is not additionally displayed. Furthermore, the arrangement of the icons does not change each time. Therefore, the operation to be executed by the user does not become complicated.

Second Embodiment

Next, the digital camera 100 according to the present embodiment will be described. In the present embodiment, the same reference numerals are given respectively to the same points as those of the digital camera 100 according to the first embodiment, and the description thereof will be omitted. In the digital camera 100 according to the present embodiment, when specific information has been attached to a process-target image, an icon for changing the content of the specific information is displayed on the image erasure confirmation screen.

Figure 11:
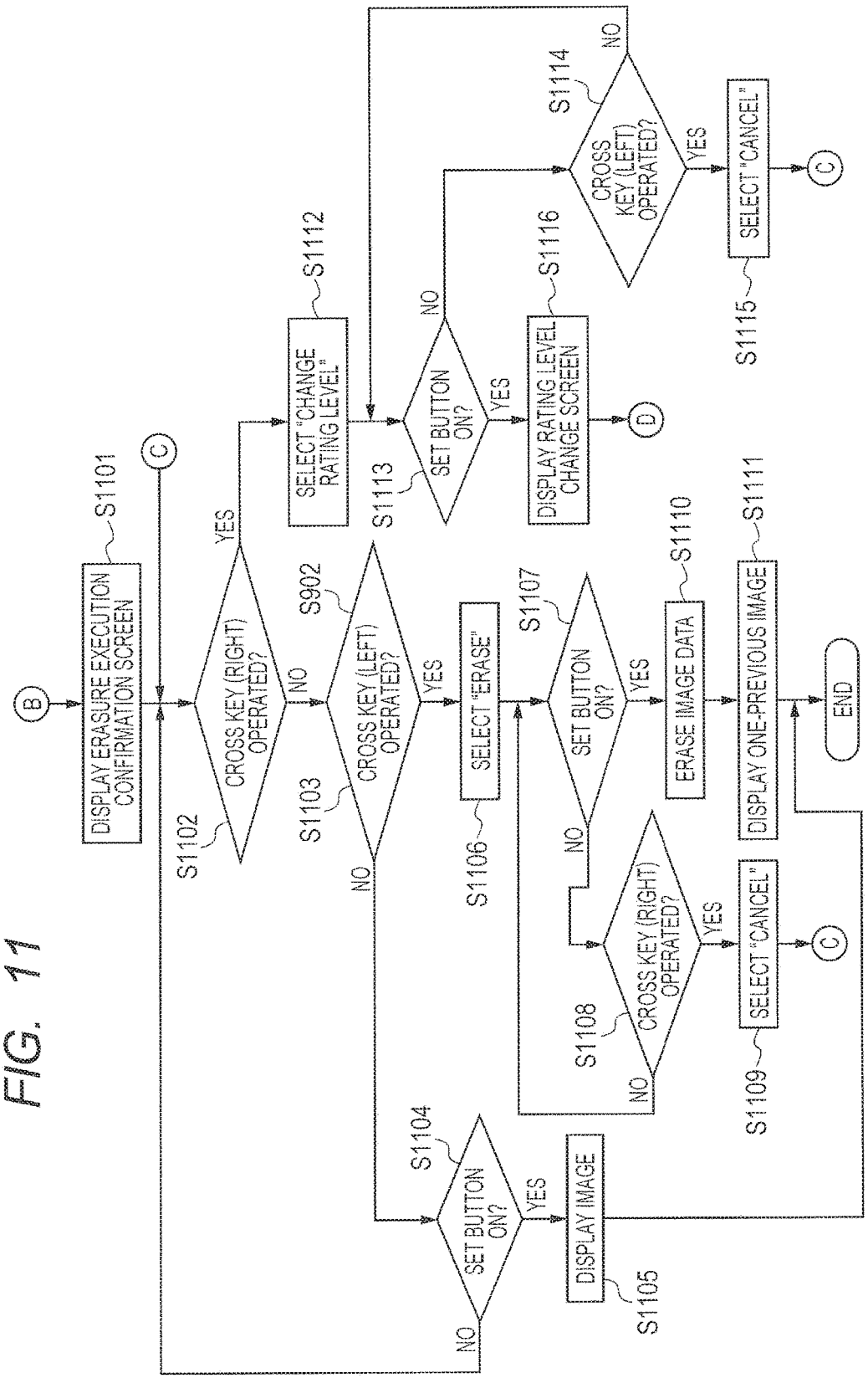
FIG. 11 is a flow chart for describing an image reproducing/erasing process in a second embodiment.
Figure 12A:
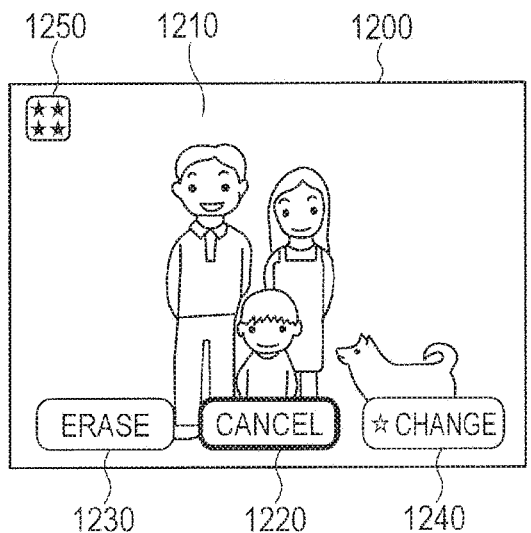
FIGS. 12A, 12B and 12C are diagrams for describing transition of an erasure execution confirmation screen in the second embodiment.
Figure 12B:
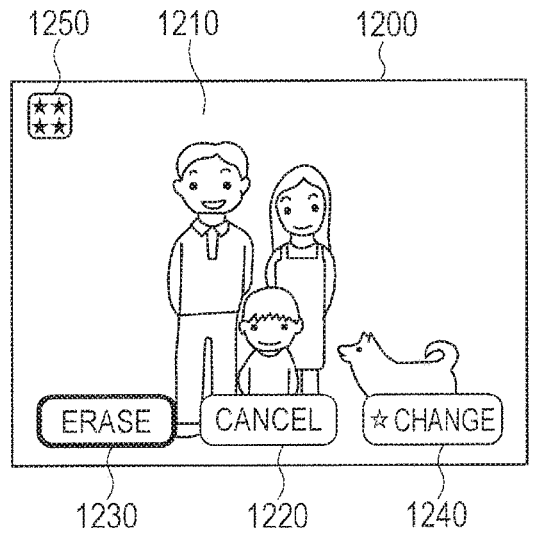
Figure 12C:
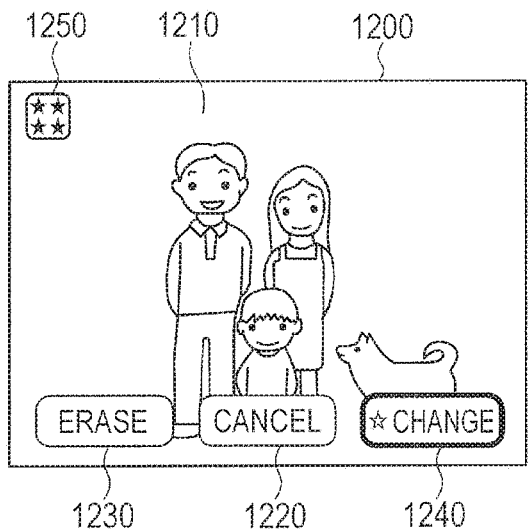

A process of erasing, in the image reproducing/erasing process, the image to which the specific information has been attached will be described with reference to FIG. 11 and FIGS. 12A to 12C. FIG. 11 is the flow chart for describing the process of erasing, in the image reproducing/erasing process, the image to which the specific information has been attached. FIGS. 12A to 12C are the diagrams for describing transition of an erasure execution confirmation screen 1200 of the image to which the specific information has been attached.

In the present embodiment, a process in S1101 of FIG. 11 is executed when the system controlling circuit 150 determines in S306 of FIG. 3 that the specific information has been attached to the image which is currently reproduced and displayed on the image displaying unit 128.

In S1101, the system controlling circuit 150 executes display control to display the erasure execution confirmation screen 1200 on the image displaying unit 128.

Here, the erasure execution confirmation screen 1200 will be described with reference to FIGS. 12A to 12C. As well as the erasure execution confirmation screen 800 of the first embodiment, the erasure execution confirmation screen 1200 is a confirmation screen for confirming whether or not the process of erasing the image is executable. On the erasure execution confirmation screen 1200, a process-target image 1210, a "cancel (CANCEL)" icon 1220, an "erase (ERASE)" icon 1230, a "change rating level (CHANGE)" icon 1240 and a "specific information" icon 1250 are displayed. The erasure execution confirmation screen 1200 of the present embodiment is different from the erasure execution confirmation screen 800 of the first embodiment in the point that the "change raging level" icon 1240 is additionally provided.

The process-target image 1210 is an image to be subjected to the erasing process, and is an image displayed on the immediately preceding image reproduction screen 400. The specific information has been attached to the process-target image 1210 here.

Each of the "cancel" icon 1220 and the "erase" icon 1230 is the same as the icon of the same name on the erasure execution confirmation screen 800 illustrated in FIGS. 8A and 8B. The "cancel" icon 1220 is arranged at the lower center of the erasure execution confirmation screen 1200. The "erase" icon 1230 is arranged on the lower left side of the erasure execution confirmation screen 1200.

The "change rating level" icon 1240 is an icon for the user to execute an instruction operation for changing rating information which is the specific information, and is superimposed and displayed on the process-target image 810. The "change rating level" icon 1240 is arranged on the lower right side of the erasure execution confirmation screen 1200.

The "cancel" icon 1220, the "erase" icon 1230 and the "change rating level" icon 1240 are displayed in a selectable way on the erasure execution confirmation screen 1200. As illustrated in FIG. 12A, the initial state of the erasure execution confirmation screen 1200 is a state that the "cancel" icon 1220 has been initially selected.

The "specific information" icon 1250 is an icon which indicates the specific information attached to the process-target image 1210, and is superimposed and displayed on the process-target image 1210. Here, it is assumed that a rating level "4" as the specific information has been attached to the process-target image 1210 illustrated in FIGS. 12A to 12C.

The system controlling circuit 150 controls the memory controlling circuit 122 to create an image of the erasure execution confirmation screen 1200, store the created image in the image display memory 124, and then display the stored image on the image displaying unit 128. In the erasure execution confirmation screen 1200 displayed in S1101, the "cancel" icon 1220 has been initially selected.

In S1102, the system controlling circuit 150 determines whether or not the cross key 170 is operated and thus the right button 174 of the cross key 170 is ON. When it is determined that the right button 174 of the cross key 170 is ON, the system controlling circuit 150 advances the process to S1112. On the other hand, when it is determined that the right button 174 of the cross key 170 is not ON, the system controlling circuit advances the process to S1103.

In S1103, the system controlling circuit 150 determines whether or not the cross key 170 is operated and thus the left button 173 of the cross key 170 is ON. When it is determined that the left button 173 of the cross key 170 is ON, the system controlling circuit 150 advances the process to S1106. On the other hand, when it is determined that the left button 173 is not ON, the system controlling circuit advances the process to S1104.

In S1104, the system controlling circuit 150 determines whether or not the set button 168 is ON. When it is determined that the set button 168 is ON, the system controlling circuit 150 advances the process to S1105. On the other hand, when it is determined that the set button 168 is not ON, the system controlling circuit returns the process to S1102.

In S1105, the system controlling circuit 150 terminates the display of the erasure execution confirmation screen 1200, and executes display control to display the most recently displayed image reproduction screen 400 on the image displaying unit 128.

In S1106, the system controlling circuit 150 executes control so as to be in the state that the "erase" icon 1230 on the erasure execution confirmation screen 800 is selected as illustrated in FIG. 12B.

In S1107, the system controlling circuit 150 determines whether or not the set button 168 is ON. When it is determined that the set button 168 is ON, the system controlling circuit 150 advances the process to S1110. On the other hand, when it is determined that the set button 168 is not ON, the system controlling circuit advances the process to S1108.

In S1108, the system controlling circuit 150 determines whether or not the cross key 170 is operated and thus the right button 174 of the cross key 170 is ON. When it is determined that the right button 174 of the cross key 170 is ON, the system controlling circuit 150 advances the process to S1109. On the other hand, when it is determined that the right button 174 of the cross key 170 is not ON, the system controlling circuit returns the process to S1107.

In S1109, the system controlling circuit 150 executes control so as to be in the state that the "cancel" icon 1220 on the erasure execution confirmation screen 1200 is selected as illustrated in FIG. 12A. Thereafter, the system controlling circuit 150 returns the process to S1102.

In S1110, the system controlling circuit 150 executes control to erase the process-target image 1210 displayed on the erasure execution confirmation screen 1200, from the recording area 102a of the recording medium 102.

In S1111, the system controlling circuit 150 executes display control to display the image reproduction screen 400 on the image displaying unit 128. The image to be reproduced on the image reproduction screen 400 is an image which has been recorded in the recording area 102a of the recording medium 102 and is one-previous image of the image erased in S1110.

In S1112, the system controlling circuit 150 executes control so as to be in the state that the "change rating level" icon 1240 on the erasure execution confirmation screen 1200 is selected as illustrated in FIG. 12C.

In S1113, the system controlling circuit 150 determines whether or not the set button 168 is ON. When it is determined that the set button 168 is ON, the system controlling circuit 150 advances the process to S1116. On the other hand, when it is determined that the set button 168 is not ON, the system controlling circuit advances the process proceeds to S1114.

In S1114, the system controlling circuit 150 determines whether or not the cross key 170 is operated and thus the left button 173 of the cross key 170 is ON. When it is determined that the left button 173 of the cross key 170 is ON, the system controlling circuit 150 advances the process to S1115. On the other hand, when it is determined that the left button 173 is not ON, the system controlling circuit returns the process to S1113.

In S1115, the system controlling circuit 150 executes control so as to be in the state that the "cancel" icon 1220 on the erasure execution confirmation screen 1200 is selected as illustrated in FIG. 12A. Thereafter, the system controlling circuit 150 returns the process to S1102.

In S1116, the system controlling circuit 150 executes display control to display a rating level change screen 1300 on the image displaying unit 128.

Figure 13A:
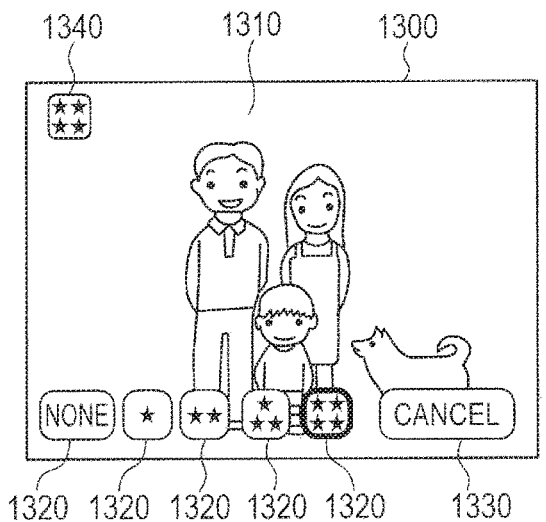
FIGS. 13A, 13B and 13C are diagrams for describing transition of a rating level change screen and the like in the second embodiment.
Figure 13B:
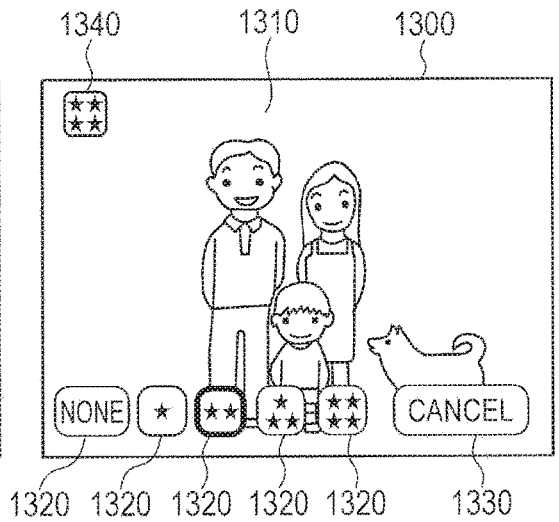

Here, the rating level change screen 1300 will be described with reference to FIGS. 13A and 13B. FIGS. 13A and 13B are the diagrams for describing transition of the rating level change screen 1300.

The rating level change screen 1300 is a screen for changing the rating information which is the specific information of the present embodiment. On the rating level change screen 1300, a process-target image 1310, "rating level" icons 1320, a "cancel (CANCEL)" icon 1330 and a "specific information" icon 1340 are displayed.

The process-target image 1310 is a target image for which the rating information is to be changed, and is the same image as the process-target image 1210 of the immediately preceding erasure execution confirmation screen 1200.

The "cancel" icon 1330 is an icon for the user to execute an instruction operation for canceling the change of the rating information, and is arranged on the lower right side of the rating level change screen 1300.

There are the plurality of "rating level" icons 1320, each of these icons represents a different rating level. By selecting one of the "rating level" icons 1320 and turning on the set button 168, the user can change the rating level of the process-target image 1310 to one corresponding to the selected "rating level" icon 1320. The "rating level" icons 1320 are placed on the left side of the "cancel" icon 1330. In example illustrated in FIGS. 13A to 13C, the number of asterisks indicated in the "rating level" icon 1320 represents the rating level.

In the initial state, the rating level change screen 1300 is in a state that the "rating level" icon 1320 corresponding to the rating level of the process-target image 1310 has been selected. The rating level of the process-target image 1310 described here is "4". Therefore, as illustrated in FIG. 13A, in the rating level change screen 1300 in the initial state, the "rating level" icon 1320 corresponding to the rating level "4" has been selected.

The "specific information" icon 1340 is an icon which indicates the specific information attached to the process-target image 1310, and is superimposed and displayed on the process-target image 1310.

Incidentally, in the rating level change screen 1300, the "cancel" icon 1330 may be arranged on the lower left side. At this time, the "rating level" icon 1320 is arranged on the right side of the "cancel" icon 1330, for example.

Figure 14:
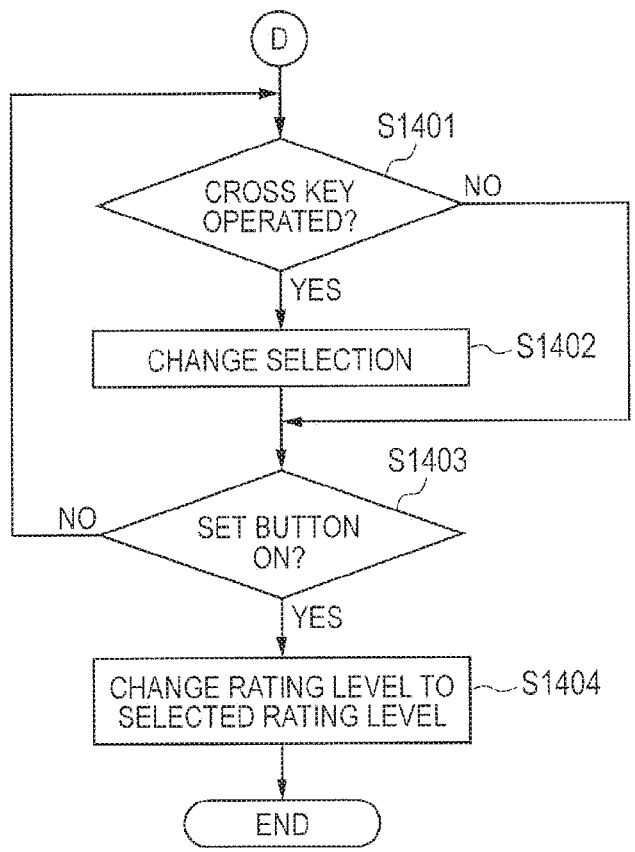
FIG. 14 is a flow chart for describing the image reproducing/erasing process in the second embodiment.

After S1116, the system controlling circuit 150 advances the process to S1401 of FIG. 14.

Next, a process of changing the specific information in the image reproducing/erasing process will be described with reference to FIG. 14. Namely, FIG. 14 is the flow chart for describing the process for changing specific information in the image reproducing/erasing process.

In S1401, the system controlling circuit 150 determines whether or not the cross key 170 is operated. When it is determined that the cross key 170 is operated, the system controlling circuit 150 advances the process to S1402. On the other hand, when it is determined that the cross key 170 is not operated, the system controlling circuit advances the process to S1403.

In S1402, the system controlling circuit 150 executes control to change the selected icon on the rating level change screen 1300 in accordance with the direction indicated by the button of the operated cross key 170 and the number of times of operation.

For example, it is assumed that the left button 173 of the cross key 170 is operated twice in the state that the "rating level" icon 1320 representing the rating level "4" is selected on the rating level change screen 1300 as illustrated in FIG. 13A. In such a case, the system controlling circuit 150 executes control so as to be in the state that the second icon from the left side of the icon selected in FIG. 13A is selected. Therefore, as illustrated in FIG. 13B, the "rating level" icon 1320 which represents the rating level "2" is selected.

In S1403, the system controlling circuit 150 determines whether or not the set button 168 is ON. When it is determined that the set button 168 is ON, the system controlling circuit 150 advances the process to S1404. On the other hand, when it is determined that the set button 168 is not ON, the system controlling circuit returns the process to S1401.

In S1404, the system controlling circuit 150 executes control to change the rating information of the process-target image 1310 to the rating level corresponding to the "rating level" icon 1320 selected on the rating level change screen 1300.

Figure 13C:
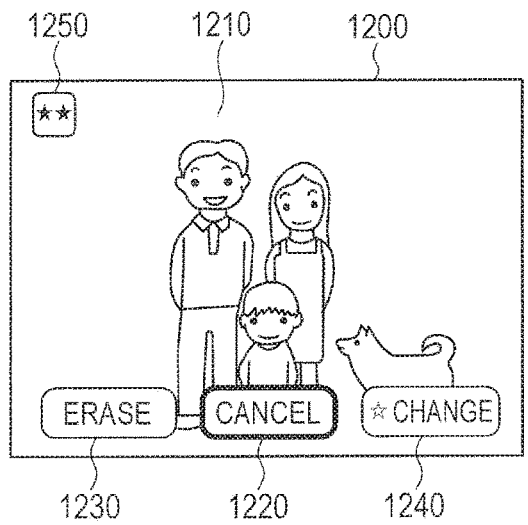

Incidentally, in a case where the set button 168 is turned ON when the "cancel" icon 1330 on the rating level change screen 1300 has been selected, the system controlling circuit 150 may execute the following process. That is, the system controlling circuit 150 may execute display control to display the most recently displayed erasure execution confirmation screen 1200 on the image displaying unit 128 as illustrated in FIG. 13C, and return the process to S1113 in FIG. 11 or the like.

As described above, the "change rating level" icon 1240 is displayed on the erasure execution confirmation screen 1200 for the image to which the specific information has been attached, so that the rating information which is the specific information can be changed. Therefore, it is possible for the user to change the specific information when executing the operation related to the specific information without using the setting screen or the like, thereby improving convenience or user-friendliness.

Besides, as well as the above embodiment, it is possible to prevent an erroneous operation by the user, and it is also possible to avoid complexity of operations by the user.

Third Embodiment

Next, the digital camera 100 according to the present embodiment will be described. In the present embodiment, the same points as those of the digital camera 100 according to the above embodiments are denoted by the same reference numerals, and the description thereof will be omitted.

The digital camera 100 according to the present embodiment is the same as the digital camera 100 according to the second embodiment except for an icon arrangement on an erasure execution confirmation screen 1500 and icons selected on the erasure execution confirmation screen 1500 in the initial state. Here, the erasure execution confirmation screen 1500 is an erasure execution confirmation screen related to an image to which specific information has been attached in the present embodiment.

Figure 15A:
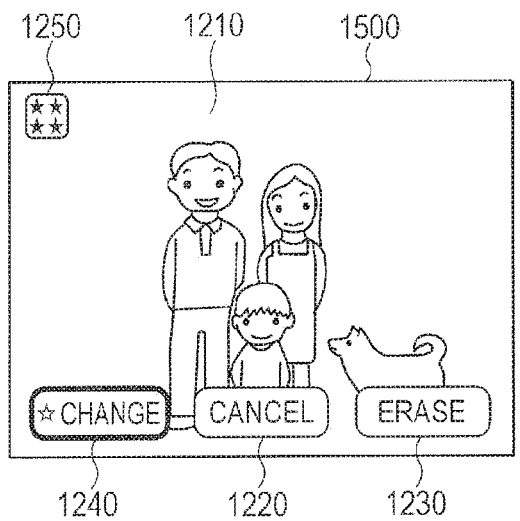
FIGS. 15A and 15B are diagrams for describing transition of an erasure execution confirmation screen in a third embodiment.

Hereinafter, the erasure execution confirmation screen 1500 related to the image to which the specific information has been attached in the present embodiment will be described with reference to FIG. 15A. On the erasure execution confirmation screen 1500, the process-target image 1210, the "cancel" icon 1220, the "erase" icon 1230, the "change rating level" icon 1240 and the "specific information" icon 1250 are displayed.

On the erasure execution confirmation screen 1500 according to the present embodiment, the "change rating level" icon 1240 has been selected in the initial state.

On the erasure execution confirmation screen 1500 according to the present embodiment, the "cancel" icon 1220 is arranged at the lower center, and the "erase" icon 1230 is arranged on the right side of the "cancel" icon 1220. Besides, the "change rating level" icon 1240 is arranged on the left side of the "cancel" icon 1220. The arrangements of the "cancel" icon 1220 and the "erase" icon 1230 on the erasure execution confirmation screen 1500 in the present embodiment are the same as those on the erasure execution confirmation screen 600 related to the image to which the specific information is not attached as illustrated in FIG. 6B.

In the present embodiment, the erasure execution confirmation screen related to the image to which the specific information is not attached is the same as the erasure execution confirmation screen 600 described with reference to FIGS. 6A to 6C. For this reason, in the initial state of the erasure execution confirmation screen 600 related to the image to which the specific information is not attached, the "cancel" icon 620 has been initially selected. Therefore, with respect to the image to which the specific information is not attached, in order to select the "erase" icon 630 for erasing the image, the user has to turn ON the right button 174 of the cross key 170 once on the erasure execution confirmation screen 600.

On the other hand, with respect to the image to which the specific information has been attached, in order to select the "erase" icon 1230 for erasing the image, it is necessary to turn ON the right button 174 of the cross key 170 twice on the erasure execution confirmation screen 600. Therefore, as well as the above embodiment, it is possible to prevent an erroneous operation resulting from habituation of handling caused by the repetitive operations. Besides, as well as the above embodiment, it is possible to avoid complexity of operations by a user.

Figure 15B:
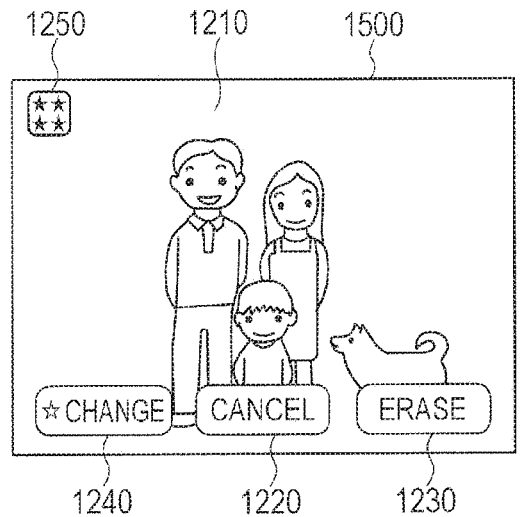

Next, the digital camera 100 according to a modified example of the present embodiment will be described with reference to FIG. 15B. Also in the modified example, as illustrated in FIG. 15B, the arrangements of the respective icons on the erasure execution confirmation screen 1500 related to the image to which the specific information has been attached are the same as those on the erasure execution confirmation screen 1500 illustrated in FIG. 15A.

However, in the erasure execution confirmation screen 1500 of the modified example, none of the icons is selected in the initial state. That is, in the modified example, after the erasure execution confirmation screen 1500 in the initial state is displayed, when the operation of the cross key 170 is detected, for example, the system controlling circuit 150 executes control so as to be in the state that the "cancel" icon 1220 is selected.

Also in the modified example, the erasure execution confirmation screen related to the image to which the specific information is not attached is the same as the erasure execution confirmation screen 600 described with reference to FIGS. 6A to 6C. For this reason, in the initial state of the erasure execution confirmation screen 600 related to the image to which the specific information is not attached, the "cancel" icon 620 has been initially selected. Therefore, with respect to the image to which the specific information is not attached, in order to select the "erase" icon 630 for erasing the image, the user has to turn ON the right button 174 of the cross key 170 once on the erasure execution confirmation screen 600.

On the other hand, on the erasure execution confirmation screen 1500 related to the image to which the specific information has been attached, no icon is selected in the initial state. Then, when the user operates the cross key 170, the "cancel" icon 1220 is selected. Therefore, as well as the above embodiment, it is possible to prevent an erroneous operation resulting from habituation of handling caused by the repetitive operations. Besides, as well as the above embodiment, the operation by the user does not become complicated.

Another Embodiment

In the above embodiment, the specific information is the rating information, and the process to be executed to the image is the process of erasing the image. However, the specific information may be other than the rating information, and the process to be executed to the image may be other than the process of erasing the image.

Hereinafter, protection information will be described as an example of the specific information. The protection information is information which is related to protection of an image. As the protection information, for example, there are print unnecessary information which indicates that printing of an image is unnecessary, transfer unnecessary information which indicates that transfer of an image is unnecessary, and folder non-movable information which indicates that a folder in which an image has been stored or saved cannot be changed. In addition, as the protection information, there is data uncopiable information which indicates that an image cannot be copied.

Hereinafter, printing, transferring, folder moving and copying will be exemplarily described as examples as processes for image.

First, a first process execution confirmation screen 1600 will be described with reference to FIG. 16A. The first process execution confirmation screen 1600 is a screen which is displayed when an image to which the print unnecessary information being the protection information has been attached as the specific information is printed.

When it is detected that a user executes the printing operation while the image to which the print unnecessary information has been attached as the specific information is displayed on the image reproduction screen 400, the system controlling circuit 150 executes display control to display the first process execution confirmation screen 1600 on the image displaying unit 128.

The first process execution confirmation screen 1600 is basically the same as the erasure execution confirmation screen 1200 illustrated in FIGS. 12A to 12C. However, a "print (PRINT)" icon 1610 is displayed instead of the "erase" icon 1230, and a "release protection (RELEASE)" icon 1620 is displayed instead of the "change rating level" icon 1240. Besides, instead of the "specific information" icon 1250 representing the rating level, a "specific information" icon 1660 indicating that the print unnecessary information has been attached is displayed.

The "print" icon 1610 is an icon for executing printing.

The "release protection" icon 1620 is an icon for releasing the protection for the printing of the process-target image 1210 by deleting the print unnecessary information of the protection information attached to the process-target image 1210.

The process execution confirmation screen which is displayed when an image to which the print unnecessary information being the protection information is not attached as the specific information is printed is basically the same as the erasure execution confirmation screen 600 illustrated in FIGS. 6B and 6C. However, the "print" icon 1610 is displayed instead of the "erase" icon 630.

Therefore, it is possible to avoid that an image that the user does not desire or wish to print is erroneously printed due to habituation of handling caused by repetitive operations. Thus, it is possible to avoid wasting inks, printing paper and the like of a printing machine.

Next, a second process execution confirmation screen 1601 will be described with reference to FIG. 16B. The second process execution confirmation screen 1601 is a screen which is displayed when an image to which the transfer unnecessary information being the protection information has been attached as the specific information is transferred. When it is detected that the user executes the operation of transferring the image while the image to which the transfer unnecessary information has been attached as the specific information is displayed on the image reproduction screen 400, the system controlling circuit 150 executes display control to display the second process execution confirmation screen 1601 on the image displaying unit 128.

Figure 16A:
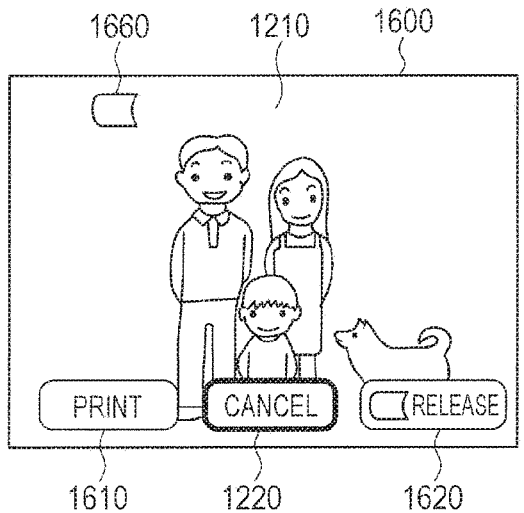
FIGS. 16A, 16B, 16C and 16D are diagrams for describing transition of process execution confirmation screens in another embodiment.
Figure 16B:
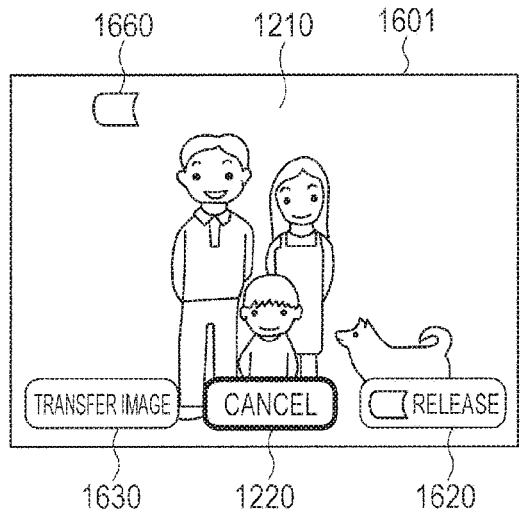

The second process execution confirmation screen 1601 is basically the same as the first process execution confirmation screen 1600 illustrated in FIG. 16A. However, a "transfer (TRANSFER IMAGE)" icon 1630 is displayed instead of the "print" icon 1610.

The "transfer" icon 1630 is an icon for executing image transfer.

The "release protection" icon 1620 on the second process execution confirmation screen 1601 is an icon for releasing the protection for the transfer of the process-target image 1210 by deleting the transfer unnecessary information being the protection information attached to the process-target image 1210.

The process execution confirmation screen which is displayed when an image to which the transfer unnecessary information being the protection information is not attached as the specific information is transferred is basically the same as the erasure execution confirmation screen 600 illustrated in FIGS. 6B and 6C. However, the "transfer" icon 1630 is displayed instead of the "erase" icon 630.

Therefore, it is possible to avoid that the user erroneously transfers, due to habituation by the repetitive operations, the image that he/she does not desire to transfer and thus the image that he/she does not want to disclose to others is unwillingly transferred.

Figure 16C:
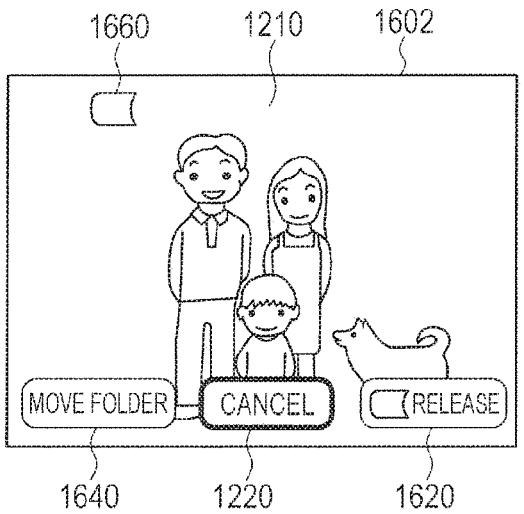

Next, a third process execution confirmation screen 1602 will be described with reference to FIG. 16C. The third process execution confirmation screen 1602 is a screen which is displayed when a folder of an image to which the folder non-movable information being the protection information has been attached as the specific information is handled. When it is detected that a user executes a folder moving operation of the image while the image to which the folder non-movable information has been attached as the specific information is displayed on the image reproduction screen 400, the system controlling circuit 150 executes the following process. That is, the system controlling circuit 150 executes display control to display the third process execution confirmation screen 1602 on the image displaying unit 128.

The third process execution confirmation screen 1602 is basically the same as the first process execution confirmation screen 1600 illustrated in FIG. 16A. However, a "move folder (MOVE FOLDER)" icon 1640 is displayed instead of the "print" icon 1610.

The "move folder" icon 1640 is an icon for executing folder movement of an image.

The "release protection" icon 1620 on the third process execution confirmation screen 1602 is an icon for releasing the protection for the folder movement of the process-target image 1210 by deleting the folder non-movable information being the protection information attached to the process-target image 1210.

The process execution confirmation screen which is displayed when an image to which the folder non-movable information being protection information is not attached as the specific information is transferred is basically the same as the erasure execution confirmation screen 600 illustrated in FIGS. 6B and 6C. However, instead of the "erase" icon 630, the "move folder" icon 1640 is displayed.

Therefore, it is possible to avoid that an image for which the user does not desire to execute the folder movement is erroneously subjected to the folder movement due to habituation of handling caused by repetitive operations. If the image which is not desired to be subjected to the folder movement is erroneously subjected to the folder movement, the user does not notice the movement of the folder of the image, so that there arises a problem that the user loses sight of the image.

Figure 16D:
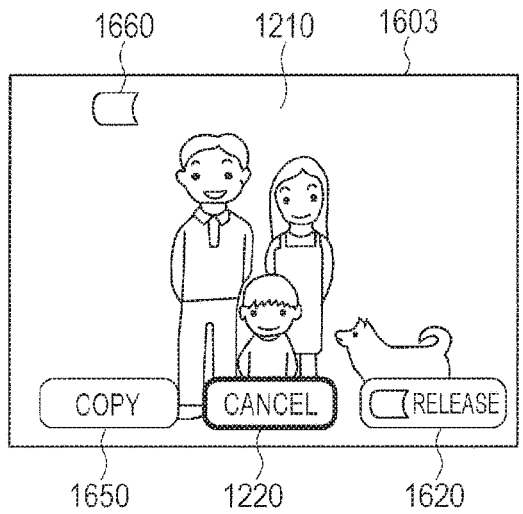

Next, a fourth process execution confirmation screen 1603 will be described with reference to FIG. 16D. The fourth process execution confirmation screen 1603 is a screen which is displayed when copying of an image to which the data uncopiable information being the protection information has been attached as the specific information is executed. When it is detected that a user executes a copying operation of the image while the image to which the data uncopiable information has been attached as the specific information is displayed on the image reproduction screen 400, the system controlling circuit 150 executes the following process. That is, the system controlling circuit 150 executes display control to display the fourth process execution confirmation screen 1603 on the image displaying unit 128.

The fourth process execution confirmation screen 1603 is basically the same as the first process execution confirmation screen 1600 illustrated in FIG. 16A. However, instead of the "print" icon 1610, a "copy (COPY)" icon 1650 is displayed.

The "copy" icon 1650 is an icon for executing copying of an image.

The "release protection" icon 1620 on the fourth process execution confirmation screen 1603 is an icon for releasing the protection for the data copying of the process-target image 1210 by deleting the data uncopiable information being the protection information attached to the process-target image 1210.

The process execution confirmation screen which is displayed at the time of executing the copying of the image to which the data uncopiable information being the protection information is not attached as the specific information is basically the same as the erasure execution confirmation screen 600 illustrated in FIGS. 6B and 6C. However, the "copy" icon 1650 is displayed instead of the "erase" icon 1230.

Therefore, it is possible to avoid that an image for which the user does not desire to execute the copying is erroneously copied due to habituation of handling caused by repetitive operations. If the image which is not desired to be copied is erroneously subjected to the copying, there may arise a problem that the user erroneously opens or exhibits the image to others without noticing the copying. Besides, even when the user notices the copying, there arises a problem that the user has to delete the copied image.

There is information which indicates that no process is to be executed in regard to an image for which charging being the protection information is required. The process execution confirmation screen same as that in the above embodiment may be prepared in regard to the process for which the charging is required as process for the image. In this case, it is possible to avoid that an unnecessary cost incurs due to erroneous execution of the process differently from the user's intention.

In each of the above embodiments, voice (sound) information may be used as the specific information. Here, the voice information is used, for example, as a voice memo. Even in this case, an erroneous operation by the user can be prevented as well as the above embodiments.

As just described, there are various processes to be executed in regard to the specific information and the image, and these processes are not limited to those described here.

In the above embodiment, the example in which the cross key 170 is used as the operation member on the process execution confirmation screen has been described. However, it may be possible to use the touch panel 182 as the operation member on the process execution confirmation screen.

For example, on the erasure execution confirmation screen 800 illustrated in FIG. 8A, the user can issue a cancel instruction in response to the touch operation to the display position of the "cancel" icon 820. Besides, in response to a touch operation to the display position of the "erase" icon 830, the user can issue an erasure instruction. As an example of the touch operation, there is a tap which is an operation of touching and then releasing the screen.

Even in this case, by changing the positional relationship between the "cancel" icon 820 and the "erase" icon 830 according to whether or not the specific information has been attached, it is possible to prevent an erroneous operation resulting from repetitive operations.

Incidentally, the above various kinds of controls described as being executed by the system controlling circuit 150 may be executed by one piece of hardware. Besides, the control of the whole apparatus may be executed by sharing the processes with a plurality of pieces of hardware.

Although the present invention has been described in detail on the basis of the preferred embodiments thereof, the present invention is not limited to these specific embodiments, and various embodiments within the scope not deviating from the substance of the present invention are also included in the present invention. Besides, each of the above embodiments is merely one embodiment of the present invention, and the respective embodiments can be properly combined with others as appropriate.

Besides, in the above embodiments, the case where the present invention is applied to the digital camera has been exemplified. However, the present invention is not limited to this, and the present invention is applicable to any electronic equipment capable of processing images. That is, the present invention is applicable to a personal computer, a PDA (personal digital assistance), a mobile phone terminal, a portable image viewer, a printer apparatuses equipped with a display, a digital photo frame, a music player, and the like. Also, the present invention is applicable to a game machine, an electronic book reader, a tablet terminal, a smartphone, a projector, a household electronic equipment including a display, a vehicle-mounted device equipped with a display, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-219588, filed Nov. 10, 2016, which is hereby incorporated by reference herein in its entirety.

What is claimed is:

1. An electronic equipment comprising:
one or more processors; and
a memory storing instructions that, when the instructions are executed by the processors, cause the electronic equipment to execute:
display controlling to execute control to display, in a case where an operation for executing a predetermined process to an image selected by an image selecting operation is executed, a confirmation screen for confirming whether or not to execute the predetermined process to the selected image, wherein a predetermined item for accepting an execution instruction of the predetermined process and another item are displayed on the confirmation screen; and
processing to execute the predetermined process to the selected image in a case where the predetermined item is selected,
wherein the display controlling is configured to execute control to display the confirmation screen so that a positional relationship between a display position of the another item and a display position of the predetermined item is different in accordance with whether or not the selected image is an image with which specific information is associated.

2. The electronic equipment according to claim 1, wherein the display controlling is configured to execute control to change the display position of the predetermined item but not to change the display position of the another item, in accordance with whether or not the selected image is the image with which the specific information is associated.

3. The electronic equipment according to claim 1, wherein the specific information includes at least one of protection information of the image, voice information of the image, and rating information of the image.

4. The electronic equipment according to claim 1, wherein the predetermined process includes a process of erasing the image.

5. The electronic equipment according to claim 1, wherein the predetermined process includes at least one of a process of transferring the image, a process of printing the image, a process of moving a folder, a process for copying, and a process for charging.

6. The electronic equipment according to claim 1, wherein the processing is configured to execute the predetermined process to the image in accordance with, in a state that the predetermined item is being selected, acceptance of a deciding operation for deciding the selection of the predetermined item.

7. The electronic equipment according to claim 1, wherein the selection of the predetermined item is executed by a touching operation in regard to the display position of the predetermined item.

8. The electronic equipment according to claim 1, wherein the stored instructions cause the electronic equipment to further execute second processing configured to execute change of the specific information, wherein
in a case where the selected image is the image with which the specific information is associated, the display controlling is configured to execute control to display on the confirmation screen an item for accepting an operation of the second processing for changing the specific information.

9. The electronic equipment according to claim 1, wherein, irrespective of whether or not the selected image is the image with which the specific information is associated, the number of times of operation necessary from a state that the confirmation screen is displayed to a time when the predetermined process is executed to the image is same.

10. The electronic equipment according to claim 1, wherein
in a case where the image is the image with which the specific information is associated, the display controlling is configured to execute control to display the predetermined item at a position adjacent to the display position of the another item in a first direction, and
in a case where the image is not the image with which the specific information is associated, the display controlling is configured to execute control to display the predetermined item at a position adjacent to the display position of the another item in a second direction different from the first direction.

11. The electronic equipment according to claim 10, wherein the second direction is the opposite direction of the first direction.

12. The electronic equipment according to claim 10, wherein the second direction is a direction perpendicular to the first direction.

13. The electronic equipment according to claim 10, wherein the stored instructions cause the electronic equipment to further execute controlling configured to execute control so as to select the predetermined item or the another item in accordance with an operation to an operation key,
wherein the controlling is configured to execute control so as to, on the confirmation screen, select the predetermined item in accordance with the operation to a first operation key, and select the another item in accordance with the operation to a second operation key different from the first operation key.

14. The electronic equipment according to claim 10, wherein, irrespective of whether or not the image is the image with which the specific information is associated, the display controlling is configured to execute control to display the confirmation screen in a state that the another item is initially selected.

15. The electronic equipment according to claim 1, wherein the another item is an item for accepting an instruction of cancelling the execution of the predetermined process.

16. An electronic equipment comprising:
one or more processors; and
a memory storing instructions that, when the instructions are executed by the processors, cause the electronic equipment to execute;
display controlling configured to execute control to display, in a case where an operation for executing a predetermined process to an image selected by an image selecting operation is executed, a confirmation screen for confirming whether or not to execute the predetermined process to the image;
processing configured to execute the predetermined process to the selected image, in accordance with acceptance of an execution instruction operation of the predetermined process in a state that the confirmation screen is displayed; and
controlling configured to execute control so as to make an operating method of the execution instruction operation different on the confirmation screen, in accordance with whether or not the selected image is an image with which specific information is associated,
wherein a predetermined item for accepting the execution instruction operation and another item are displayed on the confirmation screen, and
wherein the controlling is configured to execute control to change, in the predetermined item and the another display item to be displayed on the confirmation screen, the display item to be initially selected, in accordance with whether or not the selected image is the image with which the specific information is associated.

17. The electronic equipment according to claim 16, wherein the controlling is configured to execute control not to initially select the predetermined item, in a case where the image selected by the selecting operation is the image with which the specific information is associated.

18. A controlling method for an electronic equipment, comprising:
in a case where an operation for executing a predetermined process to an image selected by an image selecting operation is executed, executing control to display a confirmation screen for confirming whether or not to execute the predetermined process to the image, wherein a predetermined item for accepting an execution instruction of the predetermined process and another item are displayed on the confirmation screen; and
executing the predetermined process to the image, in a case where the predetermined item is selected,
wherein the control is executed to display the confirmation screen so that a positional relationship between a display position of the another item and a display position of the predetermined item is different in accordance with whether or not the image is an image with which specific information is associated.

19. A non-transitory computer-readable storage medium which stores therein a program for causing a computer to execute, in an electronic equipment:
display controlling configured to execute control to display, in a case where an operation for executing a predetermined process to an image selected by an image selecting operation is executed, a confirmation screen for confirming whether or not to execute the predetermined process to the selected image, wherein a predetermined item for accepting an execution instruction of the predetermined process and another item are displayed on the confirmation screen; and
processing configured to execute the predetermined process to the selected image in a case where the predetermined item is selected,
wherein the display controlling is configured to execute control to display the confirmation screen so that a positional relationship between a display position of the another item and a display position of the predetermined item is different in accordance with whether or not the image is an image with which specific information is associated.

* * * * *